US005883598A

United States Patent [19]
Parl et al.

[11] Patent Number: 5,883,598
[45] Date of Patent: *Mar. 16, 1999

[54] POSITION LOCATION SYSTEM AND METHOD

[75] Inventors: Steen A. Parl, Arlington; Julian Bussgang, Lexington; Jay Weitzen, Chelmsford; James M. Zagami, Woburn, all of Mass.

[73] Assignee: Signatron Technology Corporation, Concord, Mass.

[*] Notice: This patent issued on a continued prosecution application filed under 37 CFR 1.53(d), and is subject to the twenty year patent term provisions of 35 U.S.C. 154(a)(2).

[21] Appl. No.: 573,057

[22] Filed: Dec. 15, 1995

[51] Int. Cl.$^6$ .................................................. A01S 3/02
[52] U.S. Cl. .......................... 342/457; 342/465; 455/456
[58] Field of Search .................................. 342/386, 450, 342/457, 463, 465; 455/456

[56] References Cited

U.S. PATENT DOCUMENTS

| | | | |
|---|---|---|---|
| 3,680,121 | 7/1972 | Anderson et al. | 342/386 |
| 4,651,156 | 3/1987 | Martinez | 342/457 |
| 4,728,959 | 3/1988 | Maloney et al. | 342/457 |
| 4,891,650 | 1/1990 | Sheffer | 342/457 |
| 4,916,455 | 4/1990 | Bent et al. | 342/457 |
| 5,055,851 | 10/1991 | Sheffer | 342/457 |
| 5,218,367 | 6/1993 | Sheffer et al. | 342/457 |
| 5,225,809 | 7/1993 | Bunn | 340/574 |
| 5,293,642 | 3/1994 | Lo | 342/457 |
| 5,317,323 | 5/1994 | Kennedy et al. | 342/357 |
| 5,327,144 | 7/1994 | Stilp et al. | 342/387 |
| 5,365,516 | 11/1994 | Jandrel | 342/457 |
| 5,515,419 | 5/1996 | Sheffer | 379/58 |
| 5,592,180 | 1/1997 | Yokev et al. | 342/450 |

FOREIGN PATENT DOCUMENTS

| | | |
|---|---|---|
| 0 583 523 A2 | 2/1994 | European Pat. Off. . |
| 6-252832 A | 9/1994 | Japan . |
| 07-274240 A | 10/1995 | Japan . |
| 2 280 327 A | 1/1995 | United Kingdom . |
| WO 88/01061 | 2/1988 | WIPO . |
| WO 95/14935 | 6/1995 | WIPO . |
| WO 95/26510 | 10/1995 | WIPO . |

OTHER PUBLICATIONS

Kennedy, J. and Sullivan, M.C., "Direction Finding and 'Smart Antennas' Using Software Radio Architectures", *IEEE Communications Magazine*, pp. 62–68, May 1995.

*Primary Examiner*—Gregory C. Issing
*Attorney, Agent, or Firm*—Hamilton, Brook, Smith & Reynolds, P.C.

[57] ABSTRACT

A position location system includes multiple base stations spaced over a region. A portable unit within the region transmits a locating signal which is received by the base stations. The base stations report amplitude, phase and time data related to the locating signal to a control station. The control station includes a processor and memory that combine the data from all of the participating base stations to directly compute an optimal estimate of the location of the portable unit. The control station generates an ambiguity function based upon the probability that the portable unit is located at a particular position. By optimizing the ambiguity function, the error in the computation is minimized to produce an accurate position estimate.

38 Claims, 11 Drawing Sheets

POSITION LOCATION SYSTEM AND METHOD

A typical conventional position location system includes multiple base stations arranged in a predetermined pattern over a large region and spaced apart at relatively large distances, typically on the order of a few miles. To determine the location of an object within the region among the base stations, plural base stations receive a signal, such as a cellular phone signal, from the object. By analyzing the phase of the signals received, the location of the object is estimated.

Typical systems employ one of two common position location approaches. One of the approaches is called direction finding (DF) or angle of arrival and the other is known as pseudo ranging (PR) or time difference of arrival (TDOA). The direction finding method uses an antenna array such as a phased array at each base station to receive the signal from the object and determine its angle of arrival at the base station. By analyzing the difference in phase of the signal received at each antenna in the array, each of the plural base stations generates an estimate of the direction to the object. The object's location is estimated to be at the point of intersection of directional lines projected from each of the plural base stations at the computed angular directions.

In pseudo ranging systems, for each pair of base stations, the difference in time of arrival of the signal from the object at each base station is computed from the phase of the received signals. This time difference defines a hyperbola for each pair of base stations. The point at which the hyperbolas intersect provides an estimate of the location of the object.

Both of these common approaches to position location suffer from inherent inaccuracies. Since the phased arrays of antennas cannot precisely determine the angle of arrival of the signal, the direction finding approach actually does not result in several lines intersecting at one common point. Rather, the lines intersect at several points forming a region within which the object should be located. This region can be quite large depending upon certain variables such as elevation, signal strength, etc. The pseudo ranging approach is also inherently inaccurate since multiple hyperbolas do not intersect at the same point. This and other inaccuracies also result in determining a region in which the object may be located, rather than a precise position location.

At least one position location system has applied both direction finding and pseudo ranging to determine object location. However, the two approaches are applied separately, with the direction finding or angle of arrival approach being applied only to eliminate multipath errors from the location estimate. The pseudo ranging approach is used to generate the position estimate.

SUMMARY OF THE INVENTION

The present invention is directed to aposition location system and method which determine the position of an object without the inaccuracies inherent in prior systems. The system of the invention includes a portable unit, typically positioned at the object or person to be located, which transmits a locating signal into a region. A plurality of base stations receive the locating signal from the portable unit. Each base station includes at least one antenna that receives the locating signal and a receiver coupled to the antenna that generates a representative signal indicative of amplitude and phase in the locating signal as it is received at the antenna. A processor receives the representative signals from the base stations and combines information regarding amplitude and phase in the locating signal as received at the base stations to determine the position of the portable unit.

In one embodiment, the locating signal comprises two or more single-frequency tones. Each locating signal tone can be at a different frequency. The tones can be transmitted at different times, or, in an alternative embodiment, they can be transmitted simultaneously.

Because in one embodiment only single-frequency tones are used as the locating signal instead of complicated modulated signals, substantial transmission circuitry is eliminated. The portable unit can therefore be made small and lightweight, being powered by only a single small battery. The unit can therefore be comparable in size to a standard pager or can be worn on the wrist of the user.

In one embodiment, each base station includes at least two antennas that receive the locating signal from the portable unit. The antennas are spaced apart by a distance from a quarter to several wavelengths of the locating signal. In the case of two-dimensional estimation, two or more antennas at each base station are spaced apart in a plane which is defined by the two-dimensional region in which the object is located. In a three-dimensional case, elevation of the portable unit can also be estimated. In that case, each base station can also include at least one additional antenna located above or below the first at least two antennas and spaced apart from them by a distance between a quarter and several wavelengths of the locating signal.

In a preferred embodiment, the processor is located at a control station coupled to each of the base stations by modem or RF link. The processor extracts information from each representative signal related to the amplitude and phase of the locating signal at each base station. The processor uses this information in the representative signals and the relationships between the amplitude and phase of a received signal and its distance of propagation to compute the position of the object directly, without the need for projecting lines at angles of arrival or computing the intersection of hyperbolas defined by pairs of base stations.

In one embodiment, in the case of two-dimensional location, the processor uses the received base station data to compute an ambiguity function in two dimensions x and y, in which x and y are coordinates in a Cartesian coordinate system describing position within the region. The ambiguity function defines the error involved in a position determination for each point in the cartesian coordinate system. That is, for each point at x,y, the ambiguity function $A(x,y)$ depends upon the probability that the portable unit is located at that particular point x,y. The processor optimizes the ambiguity function to select a point x,y at which the associated error is minimized. That point x,y is taken as the estimate of the location of the portable unit.

Any of several different optimization procedures can be used to optimize the ambiguity function $A(x,y)$. In one embodiment, the processor first obtains a rough estimate of the object's location by a conventional method such as triangulation. Next, the processor selects six points x,y that are in close proximity to the estimated point. The ambiguity function $A(x,y)$ is solved for each of the x,y points to obtain six values. The six computed values are then used to define a parabolic surface. The point x,y at which the maximum value of the parabolic surface occurs is then taken as the estimate of the object's location.

Other optimization approaches can also be used. For example, a standard technique such as an iterative progression through trial and error to converge to the maximum can be used. Also, gradient search can be used to optimize the ambiguity function.

In the case of three-dimensional location, the two-dimensional ambiguity function A(x,y) is extended to a three-dimensional function A(x,y,z). As in the two-dimensional case, the processor optimizes the ambiguity function to select a point x,y,z as the best estimate of the object's location in three dimensions. Again, any of several known optimization procedures, such as iterative progression through trial and error, gradient search, etc., can be used to optimize the ambiguity function.

In addition to sending the locating signal, the portable unit can also be configured to transmit encoded information. The information can include an identification of the particular portable unit as well as data from sensors at the portable unit. For example, the portable unit can be used as a medical monitor worn on the user's body. Certain physical parameters such as body temperature can be sensed and translated into digital data which is transmitted by the portable unit.

In one embodiment, the position location system of the invention also includes a reference station used to synchronize the system. The reference station preferably transmits a continuous tone which may be interrupted or modulated periodically to reset base station clocks. The tone is at a different frequency than the frequency of the locating signal tones transmitted by the portable unit and therefore does not interfere with the locating signal. In an alternative embodiment, global positioning satellite (GPS) receivers are used to generate synchronous clocks at the base stations.

The system of the invention is operable in multiple modes. In a first mode, an operator at the control station initiates the location process by transmitting a command to the portable unit. In response, the portable unit transmits the locating signal into the region to the base stations. In this mode, in one embodiment, the portable unit can include a conventional paging system receiver and the command sent by the control station can be a conventional paging signal. In another mode of operation, the position location process can be initiated at the portable unit itself. In this mode, a person carrying or wearing the portable unit can request that his/her location be determined. In one embodiment, the user presses a button on the portable unit which transmits a signal to the base stations and/or the control station to request that the process be initiated.

The system and method of the invention can be applied to existing cellular telephone systems and, in a similar manner, to existing and planned two-way messaging or paging systems. The base stations of the invention can be used to augment existing cellular telephone/paging base stations. They can be installed at cellular base station sites as additional hardware, or existing cellular base stations can be modified to accommodate the system and method of the invention. For example, existing base stations can be modified by adding additional antennas required for the process of the invention. As installed at cellular base stations, the invention can be used to locate the portable unit or commercial pager as described above. In addition, the system and method can also be used to locate standard cellular telephones. Each cellular telephone transmission can include a period of unmodulated carrier which can be detected by the base stations of the invention to determine the position of a cellular telephone.

The position location system and method of the invention have several advantages over prior approaches. The approach of the present invention is to receive data from plural base stations indicative of several attributes of the locating signals preferably including amplitude, phase and time information, and, using all of these attributes, to combine the data in an optimal fashion to compute location directly using an optimization procedure. In contrast, the prior systems use only a single attribute, typically phase, of the signal transmitted by the object to be located. The prior approaches compute location indirectly by some simple geometric approach such as triangulation. The use of several attributes that are indicative of object position and the direct computation of position based on all of these attributes makes the system of the present invention far more accurate than prior systems.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
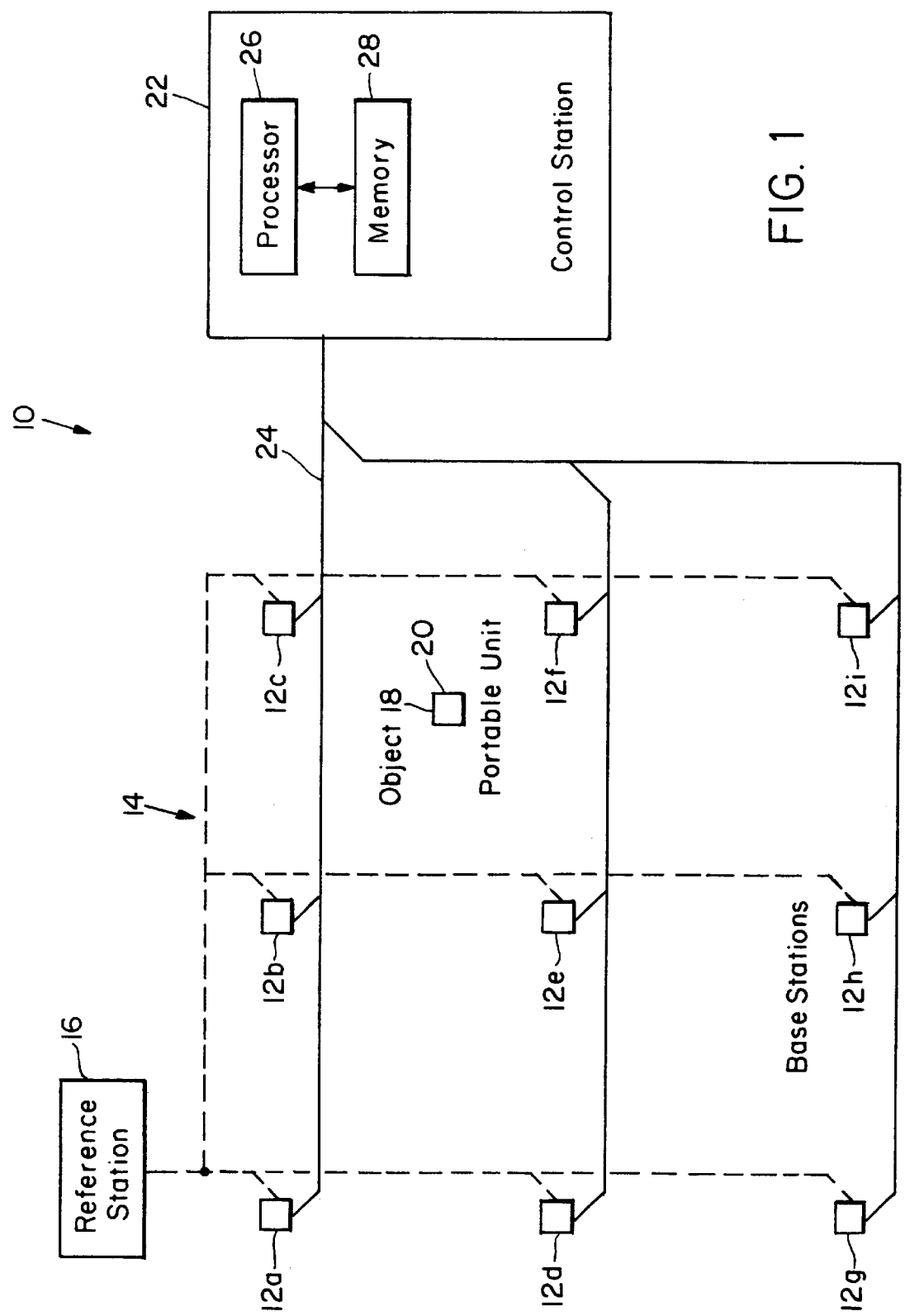
FIG. 1 is a diagram showing one preferred configuration of the position location system of the invention.

FIG. 1 is a schematic diagram of one preferred embodiment of the position location system 10 of the invention. The system 10 includes a plurality of base stations 12 labelled 12a–12i arranged in a repeating square pattern in a region 14. In one preferred embodiment, adjacent base stations 12 are separated by a distance of, for example, between 0.1 and 10 miles, as in the case in which the invention is applied to a cellular telephone system. It will be understood that the system of the invention could include more or less than the nine base stations 12a–12i shown in FIG. 1 depending on the extent of the area to be covered. Only nine base stations 12 are shown in FIG. 1 to simplify the description of the invention.

An object or person 18 whose position is to be determined by the system 10 of the invention is located within the region 14 among the base stations 12. A portable unit 20 of the invention is located at the object or person 18. The portable unit 20 can be carried by the person 18, for example, as a portable pager unit would be carried, or it can be worn on the user's wrist. The portable unit can also be built into clothing, such as a belt, shoe, etc.

When the location of the object or person 18 is to be determined, the portable unit 20 transmits a locating signal in all directions into the region 14. The locating signal can be a pair of single-frequency tones transmitted one at a time in succession or simultaneously. The locating signal is received by several of the base stations 12 which generate representative signals indicative of various attributes of the locating signal as received at the base stations. The representative signal generated by each base station preferably contains information related to the amplitude and phase of each tone and time of measurement of the locating signal as it is received at that particular base station.

Preferably, the four base stations 12b, 12c, 12e and 12f surrounding the portable unit 20 and object 18 generate the representative signals and forward them via a modem over a cable network 24 to a control station 22. Alternatively, the base stations 12 can transfer the representative signals to the control station 22 via an RF link. The control station 22 receives all of the representative signals from all of the base stations 12. A processor 26 and an associated memory 28 process the representative signals as described below in detail to determine the actual location of the object 18 and portable unit 20.

The embodiment of the system 10 shown in FIG. 1 also includes a reference station 16 which synchronizes the base stations 12 to ensure accurate timing of measurements. The reference station 16 preferably transmits a continuous tone to the base stations 12 which can be interrupted or modulated periodically to reset the clocks in the base stations 12. The tone is at a different frequency than those of the locating signal tones such that interference is avoided.

The position location system 10 of the invention implements position location in one of multiple modes. In one mode, the location process is initiated by the control station 22. A control signal or "probe" is transmitted by RF link from the control station 22 to the portable unit 20 to command the portable unit 20 to transmit the locating signals. The probe is also received by the base stations 12 to ready them to receive the locating signal from the portable unit 20.

In another mode, position location can be implemented by the person 18 at the portable unit 20. The person presses a button on the portable unit which causes a modulated alert command signal to be transmitted by RF link from the portable unit 20 to base stations 12 and/or the control station 22. The modulated alert command signal can also be modulated with information such as portable unit ID and sensor data regarding the condition of the person 18. The method of modulation may be frequency shift keying (FSK), binary phase shift keying (BPSK), quadrature phase shift keying (QPSK) or other multiple phase shift keying. When the control station 22 receives the modulated alert command from the portable unit, it generates a probe signal and transmits it back to the portable unit 20 to command the portable unit 20 to transmit the locating signals to begin position location. This return request from the control station 22 can also serve as confirmation to the user 18 at the portable unit 20 that the alert from the portable unit 20 was received by the control station 22.

Figure 2:
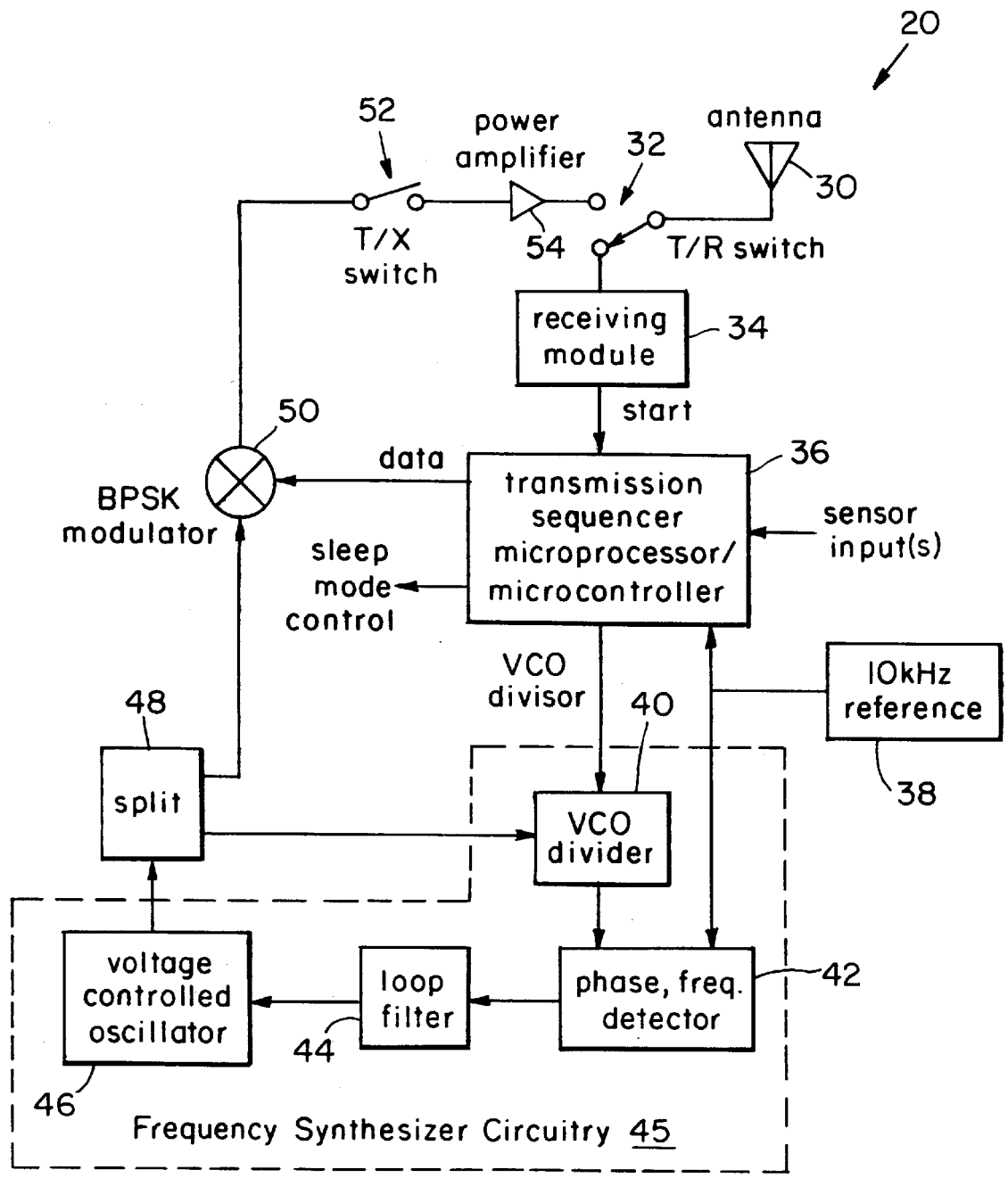
FIG. 2 is a schematic block diagram of one preferred embodiment of a portable unit in accordance with the present invention.

The individual subsystems of the position location system 10 will now be described in detail. FIG. 2 is a schematic block diagram of one embodiment of the portable unit 20 of the present invention. The portable unit 20 includes an antenna 30 coupled to a dual-position transmit/receive switch 32. In a first position as shown in the drawing, the transmit/receive switch 32 couples the antenna 30 to a receiving module 34 which receives signals from the control station 22. The receiving module 34 can be implemented in a variety of ways, including the use of a commercial pager. Alternatively, the receiving module 34 can be implemented in custom dedicated circuitry. In the case where the receiving module 34 is a commercial pager, an additional antenna for transmission is added, and the transmit/receive switch 32 is eliminated. The antenna 30 would serve as a dedicated receive antenna and would be connected directly to the receiving module 34.

When the receiving module 34 determines that a probe signal has been received, it begins the position location process by issuing a start command to a transmission sequencer microprocessor/microcontroller 36 and activating a sleep mode control signal which brings the unit out of sleep mode and into a transmit mode by changing the position of transmit/receive switch 32. The microprocessor/microcontroller 36 operates to set up transmission of the locating signals to the base stations by controlling a frequency synthesizer circuit 45. The processor/controller 36, operating from a 10 kHz reference 38, outputs a voltage controlled oscillator (VCO) divisor signal to the VCO divider 40 of the synthesizer circuitry which, in combination with the 10 kHz reference signal, generates a signal at the frequency of the first locating signal tone. The signal is passed through the phase and frequency detector 42 whose output is applied to a loop filter 44. The loop filter 44 passes a control signal to the VCO 46 to set the frequency of the VCO's output.

The VCO output is applied to the input of a splitter 48. One output of the splitter 48 is applied back to the VCO divider 40. The other output is applied to an input of a BPSK modulator 50. The modulator 50 modulates the output tone. The tone waveform is primarily designed to identify the location of the portable unit 20, but it can also be modulated by the BPSK modulator 50 to transmit any additional data that may be preprogrammed or requested, such as identification and/or status of the person or object 18 at the portable unit 20 or any sensor data which may be available at the portable unit 20. Such sensor data at the sensor inputs may include measurements reporting on the vital functions of a person being monitored, environmental data in the vicinity of the object, etc.

After the VCO divisor signal is applied by the processor/controller 36, the synthesizer circuitry 45 is allowed to settle. After the settling time, the transmit or TX switch 52 is closed or keyed down to transmit the first locating signal tone. The signal from the modulator 50 is applied through the switch 52 to a power amplifier 54. The transmit/receive switch 32 is switched to the transmit position such that the output of the power amplifier 54 is applied to the antenna 30 to transmit the first locating signal tone to the base stations.

After transmission of the first tone is completed, the processor controller 36 outputs the VCO divisor signal for the frequency of the second tone. The above process is repeated to transmit the second locating signal tone to the base stations 12. In one embodiment, the two tones are 20 kHz apart at a frequency of 100 MHz with a total transmitted power of 100 mW. In this embodiment, the timing reference signal is at a frequency at the midpoint between the frequencies of the two locating signal tones.

Figure 3:
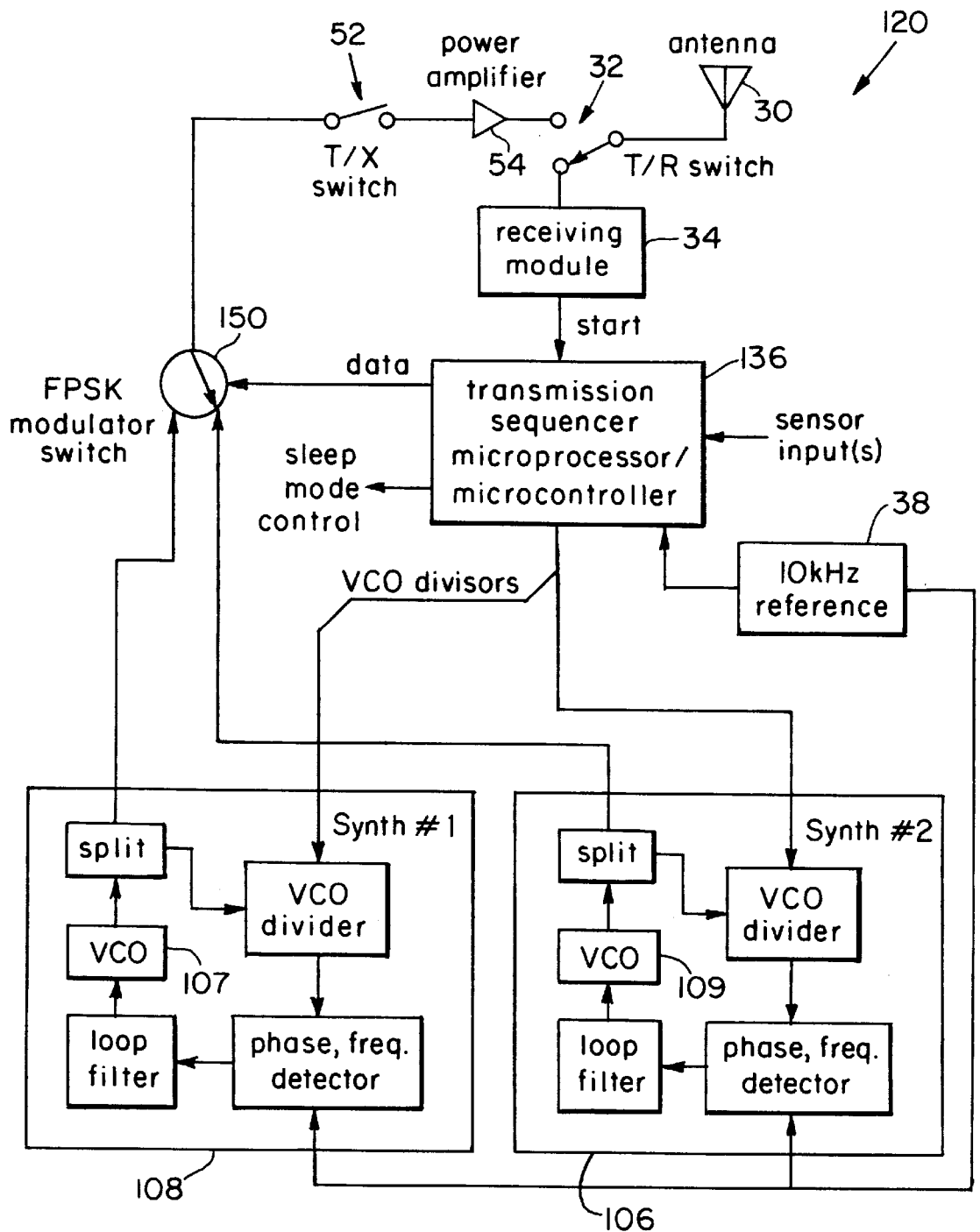
FIG. 3 is a schematic block diagram of an alternative preferred embodiment of the portable unit of the present invention.

FIG. 3 is a schematic block diagram of an alternative preferred embodiment of a portable unit 120 in accordance with the present invention. In the alternative embodiment of FIG. 3, the settling requirement of the embodiment of FIG. 2 is eliminated by the use of two frequency synthesizing circuits 106 and 108 instead of the single synthesizer circuit 45 of the embodiment of FIG. 2. In FIG. 3, the microprocessor/microcontroller 136 sends two different VCO divisors, one to each synthesizer circuit 106 and 108. The VCO 107 of circuit 108 generates the frequency of the first tone, and the VCO 109 of circuit 106 generates the second frequency tone. A switch 150 is used to select the tone signal to be forwarded to the transmission circuitry 52 and 54. In this embodiment, frequency shift keyed (FSK) modulation is used to modulate sensor data. As in the previously described embodiment, the microprocessor/microcontroller 136 controls a sleep mode of the transmission circuitry via a sleep mode control output. When the receiving module 34 indicates a probe has been received to implement position location, the sleep mode control signal becomes active to change the state of transmission circuitry from sleep mode to transmit mode.

Figure 4:
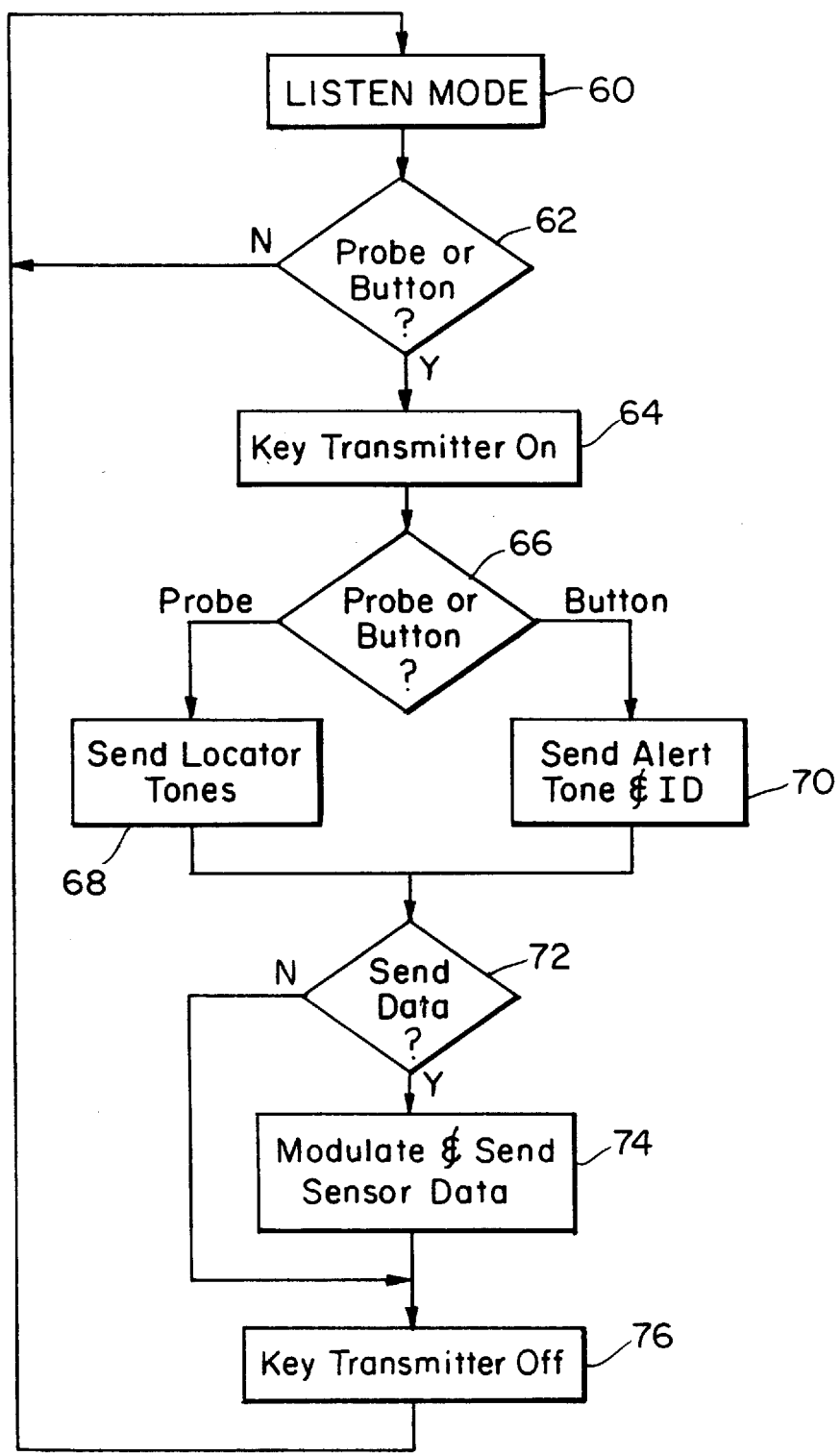
FIG. 4 is a schematic flow diagram showing the operational flow of a portable unit in accordance with the present invention.

FIG. 4 is a schematic flow diagram illustrating the operational flow of the portable unit of the present invention. As shown in step 60, before activation, the portable unit waits in listen mode to receive a command to implement the position location process. The command can come from a probe command transmitted by the control center or it can be implemented by the user by pressing a button on the portable unit.

Decision step 62 controls the listen mode. Until a probe is received or a button is pressed, the portable unit stays in listen mode. When a probe is received or a button is pressed, flow travels along the "Y" (yes) branch out of decision step 62 to step 64. In step 64, the transmitter is keyed on. Depending upon the decision in step 66, either the locator tones are transmitted or an alert tone with object identification are transmitted by the portable unit. As shown in step 68, if probe was received, then the locator signal tones are transmitted to the base stations. On the other hand, if the user pressed a button to implement position location, then, as shown in step 70, an alert tone with user ID is transmitted to the base stations. As shown in decision step 72 and step 74, if data is available for relaying to the control station, then the signal is modulated with sensor data. If no data is available, then the signal is transmitted without data modulation. After the signals are transmitted, as shown in step 76, the transmitter is keyed off, and the portable unit returns to the listen mode in step 60.

Figure 5:
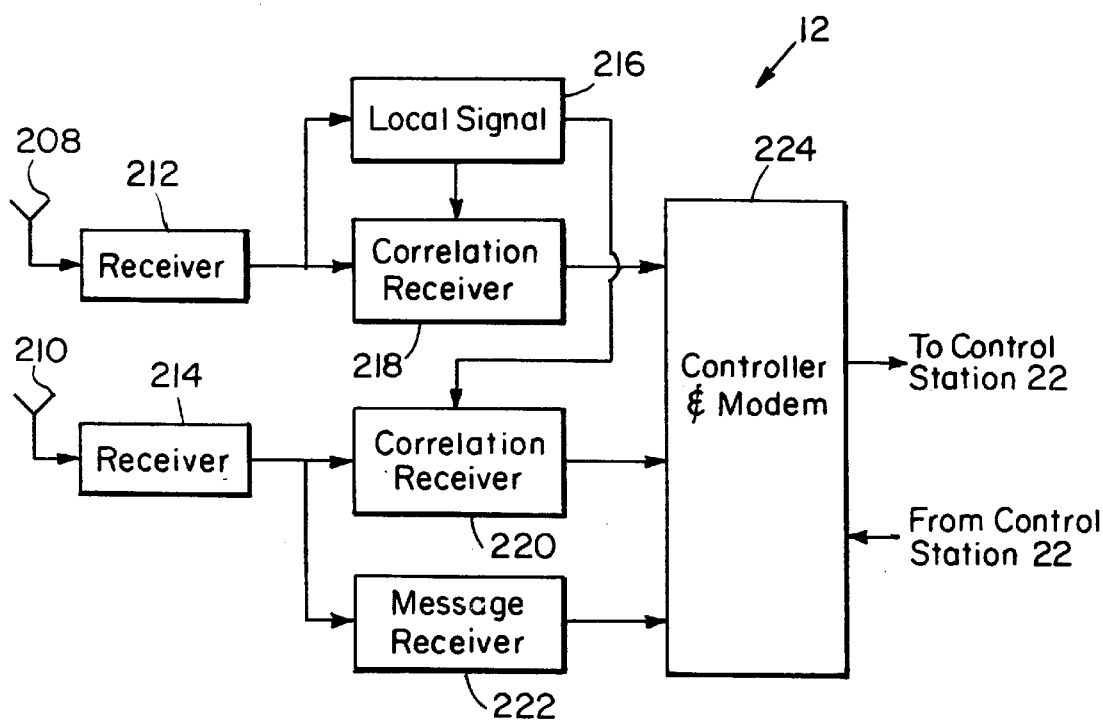
FIG. 5 is a top-level schematic block diagram of one preferred embodiment of a base station in accordance with the present invention.
Figure 8A:
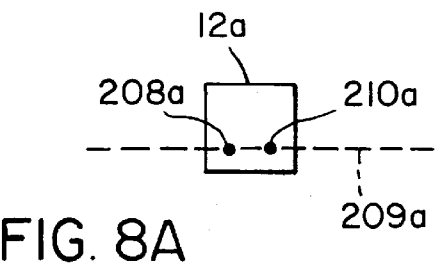
FIG. 8 is a schematic diagram depicting one preferred orientation of pairs of antennas located at four base stations used in the position location system of the invention.
Figure 8B:
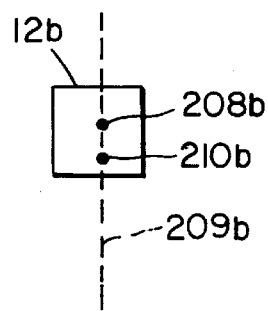
Figure 8C:
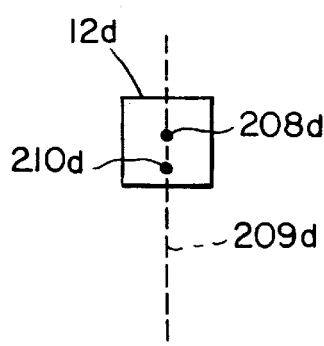
Figure 8D:
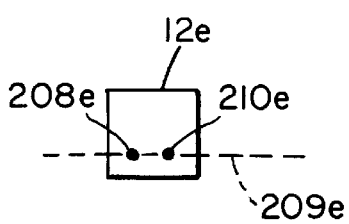

FIG. 5 is a schematic top-level block diagram of one embodiment of a base station 12 in accordance with the present invention. As described above, each base station 12 is capable of receiving the signals from the portable unit 20 as well as from the reference station 16 (see FIG. 1). Each base station 12 preferably includes at least two antennas 208 and 210 spaced from each other by a distance between a quarter wavelength and several wavelengths. Optionally, another antenna vertically above or below the two or more antennas 208, 210 also spaced by a distance of between a quarter wavelength and several wavelengths can be used where elevation is also being estimated. For the purposes of the following description, it is assumed that a spacing of one wavelength is used. It will be understood that the selected distance is used for illustration only and is not intended as a limitation.

The antennas 208, 210 are able to receive signals from any orientation of a linearly polarized transmit antenna 30 of a portable unit 20. Accordingly, the polarization of the base station antennas 208, 210 may be circular, resulting in a 3 dB loss, but capable of receiving any linear polarization. Alternatively, either dual polarization receivers may be used at the base stations 12, or different polarizations can be used at different base stations 12.

Each antenna 208, 210 is coupled to a receiver 212, 214, respectively. If necessary, at least one of the receivers 212, 214 separates the timing synchronization tone transmitted by the reference station 16 from the locating tones transmitted by the portable unit 20.

The base station 12 also includes a local signal generator 216 which locks onto the received reference station signal or to a GPS signal and generates two internal base station tones at the same nominal frequencies as the locating tones transmitted by the portable unit 20. The signal generator 216 also supplies a local clock which counts cycles of the reference station 16 or GPS tone since the last reset. This assures that all base station clocks can be synchronized to the same time referenced to the control station 22.

The base stations also include preferably two correlation receivers 218, 220, each of which is coupled to a receiver 212, 214, respectively. Each correlation receiver 218, 220 measures the phase and amplitude of the two tones received from a portable unit 20 relative to the corresponding two base station tones generated by the local signal generator 216.

The outputs from the correlation receiver 218, 220 are complex phasors optionally offset in time and frequency as discussed below. Such outputs may be provided in one of at least two ways. The first is by taking the offset measurement at a prearranged time coordinated by the control station 22, so that all base stations 12 take a measurement at the same time. The other is to take autonomous measurements which can be done whenever the correlation receiver 218, 220 detects the two locating tones from the portable unit as sufficiently high receive levels. In this second case, the correlation receiver 218, 220 records the time of the measurement and also measures any frequency difference between the tones received from the portable units and the tones generated by the local signal generator 216.

A message receiver 222 in the base station 12 can receive the two or more modulated locating tones from the portable unit as described above. The method and modulation can be frequency shift keying (FSK) or, if higher data rates are desired, phase shift keying. A message transmitted by a portable unit 20 may precede or follow its position locating tones. For user-generated alerts however, a modulated alert command may be received by a base station 12 at any time. Such a message is relayed to the control station 22 which then initiates a request for a normal position location transmission from the portable unit 20.

The outputs of the correlation receivers 218, 220 and the message receiver 222 are applied to a controller and modem 224. The controller formats message and signal data for transmission to the control station 22. In one preferred embodiment, the formatted data is transmitted by a standard telephone modem. Alternatively, a dedicated RF link can be used. The controller and modem 224 also serves the function of receiving at the base station 12 control and timing data such as time and identity of the probes from the control station 22.

Figure 6:
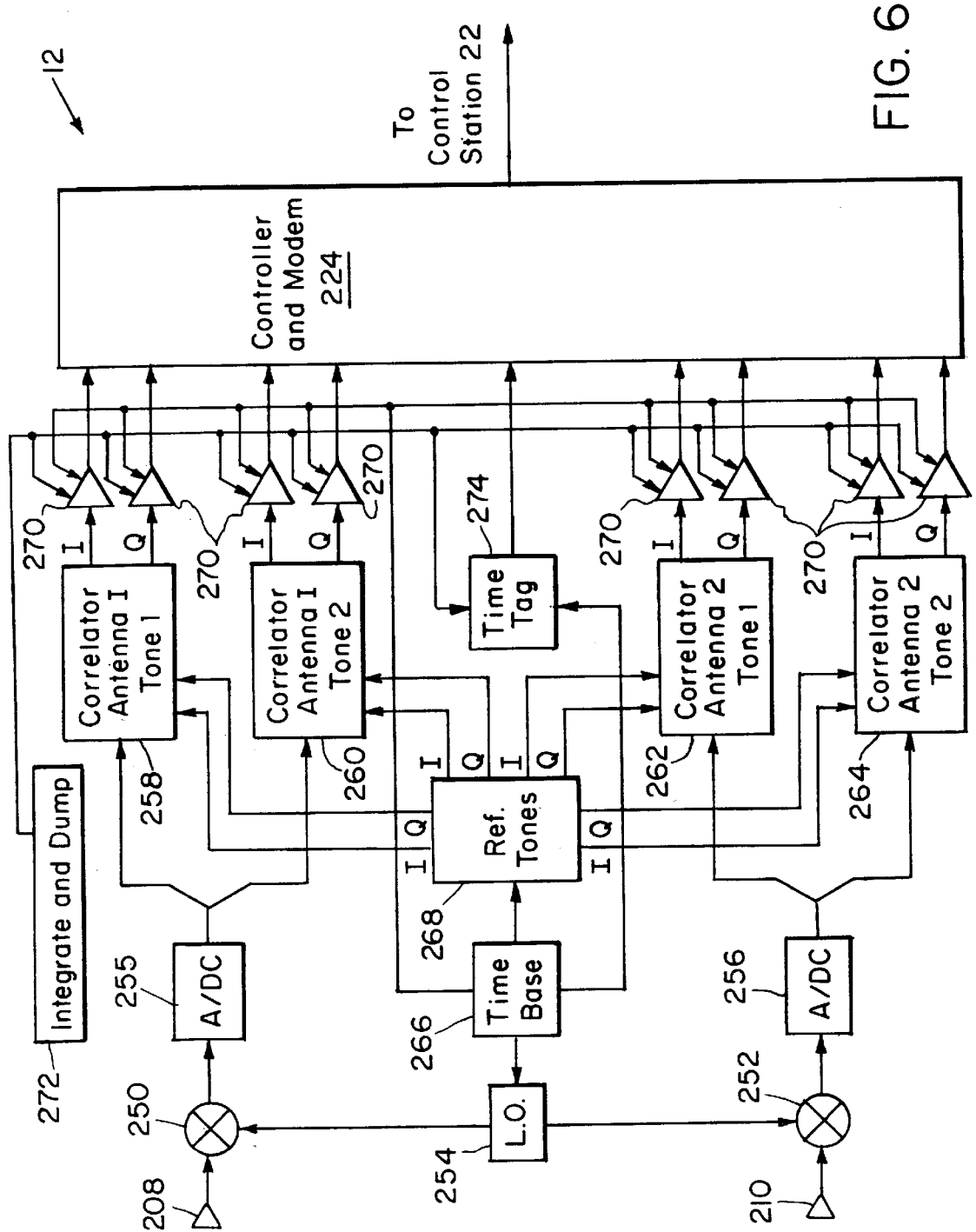
FIG. 6 is a detailed schematic block diagram of one preferred embodiment of a base station in accordance with the present invention.

FIG. 6 is a detailed schematic block diagram which shows details of the base station 12 of the present invention not shown in the top-level block diagram of FIG. 5. For purposes of the description, it is assumed that two single-frequency tones are transmitted in succession from the portable unit 20. The frequencies of the first and second tones are 100.01 MHz and 100.03 MHz, respectively. The first tone is transmitted for 100 msec and then, following a wait period of 50 msec, the second tone is transmitted for 100 msec.

The received signals at antennas 208 and 210 are applied to down converters 250 and 252, respectively. The local oscillator 254 applies a 100 MHz signal to each down converter such that when the antennas 208, 210 receive the first tone, the down converters 250 and 252 output a 10 kHz tone, and when the antennas 208, 210 receive the second tone, the down converters 250, 252 output a 30 kHz tone. The tones are digitized at A/D converters 255 and 256.

The digitized tone data is applied to correlators 258, 260, 262 and 264. As described above in connection with FIG. 5, the correlators form a portion of the correlation receiver 218, 220 for each receiver channel in the base station 12. The correlators 258, 260, 262, 264 operate synchronously at all base stations 12. Synchronization can be obtained through the transmission of a reference signal by the reference station 16 (see FIG. 1), or the use of several other available sources including GPS-based time references. This time synchronization is indicated by the time base 266 in FIG. 6. The time base 266 provides a timing signal to a reference tone generator 268 which generates the reference tones applied with the received tones to the correlators. The correlated waveforms at the output of the correlators are complex waveforms which are synchronized with the time reference. The reference tones are stored or generated digitally.

In the absence of frequency offsets, the correlators can estimate the phase and magnitude of the signals by integrating the correlator output over a fixed period of time, nominally the full 100 msec. In order to obtain the best phase estimates, the 100-msec integration should slide to obtain the best alignment with the incoming signal. This is preferably done by resetting the integrators 270 frequently, for example, at a 10 μsec interval while a running sum of correlator output values is kept in the computer. By summing the sequential correlator outputs over different time intervals, the waveform magnitude and phase of the signal during the interval in which the peak was generated can be obtained from the I and Q values.

The timing of the integrators 270 is provided by an integrate and dump timing circuit 272 which provides control signals to the integrators 270. The integrate and dump circuitry 272 also provides a control signal to time tag circuitry 274. The time tag circuitry 274 forwards time data from the time base 266 to the computer as signal I and Q data is dumped to the controller and modem 224. The time tag is forwarded to the control station 22 along with the pertinent integrator data to identify the time particular signal data was received and is used in subsequent position location calculations.

Because the integration process is carried out over a significant period of time, frequency offsets should be taken into account. Conventional techniques, such as adjusting a local oscillator using information derived from the incoming signal, are to be avoided, since the signal-to-noise ratio may be poor, and it is desirable to minimize the duration of the transmission and to minimize repeat transmissions.

One solution to this is to provide a bank of correlators, each at a slightly different frequency, or to sample the correlator output at a high rate and subject the sampled output to Fourier analysis. The number of correlators in the bank or the rate at which the correlator output is to be sampled is determined by (1) the maximum frequency offset, which is dominated by motion and the stability of portable unit crystal, and (2) the required integration period. In the 100 MHz case, frequency offsets due to crystal tolerance, aging and temperature effects can be as high as ±2,000 Hz. If the correlator is applying a 10 kHz reference tone, then the output of the correlators would be quadrature tones anywhere from DC to 2000 Hz, instead of simply DC values. In order to extract the needed information without knowledge of the frequency offset or time of arrival of the signal, the correlator output needs to be sampled at least at the Nyquist rate, i.e., 4,000 Hz.

Figure 7:
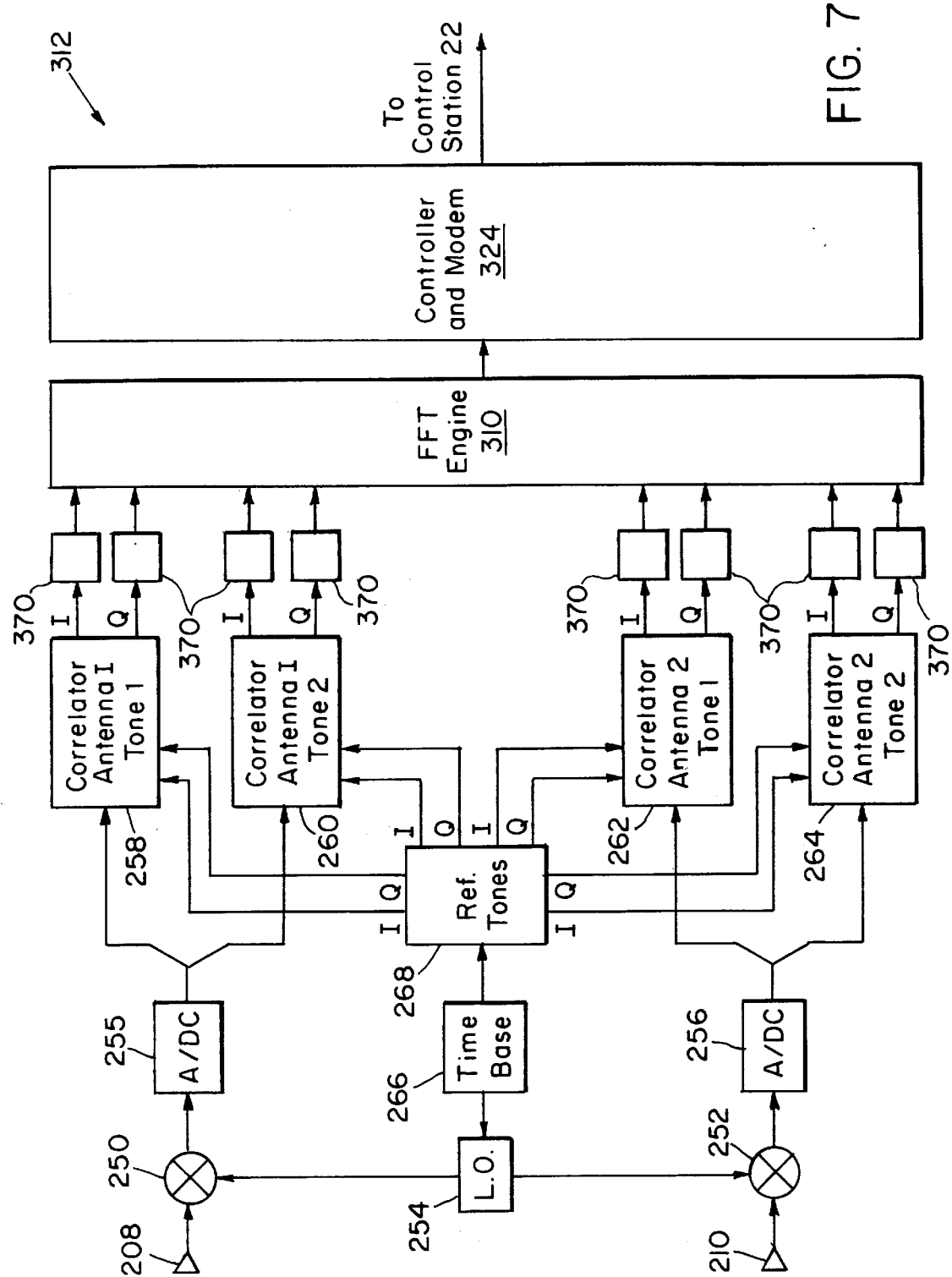
FIG. 7 is a detailed schematic block diagram of an alternative preferred embodiment of a base station in accordance with the present invention.

This requirement leads to the implementation of FIG. 7. The embodiment depicted in FIG. 7 is a variation on that shown in FIG. 6. In the embodiment of FIG. 7, each of the I and Q correlator outputs is applied to a low pass filter 370 whose outputs are then fed to an FFT engine 310. If the signal is sampled at 10 kHz and 100-point transforms are executed, the window of integration in the FFT is 10 msec, so ten successive FFTs would span the received tone. To reduce the small potential degradation in this process, which is due to non-optimal use of the signal energy, overlapped FFTs could be used.

There are other options which can be used to process the digitized samples, including other transform types. Also, the correlators can be eliminated altogether, and all processing can then be done in the FFT. Due to the low sample rates, it is possible to make multiple passes with the sampled data in real time.

FIG. 8 is a schematic diagram illustrating four base stations 12a, 12b, 12d and 12e arranged in the preferred square configuration. The diagram illustrates one method of orienting the base stations 12 with respect to each other such that the antennas 208, 210 on each base station are oriented relative to each other to optimize the accuracy of the position location process of the invention. Each pair of antennas 208, 210 on a particular base station 12 defines an antenna axis 209 which extends through the center of both antennas 208, 210. In the preferred configuration shown in FIG. 8, the antenna axes of horizontally or vertically adjacent base stations 12 are orthogonal to each other. This improves the ability of the antennas 208, 210, their associated receivers and other circuitry to accurately determine the direction to the portable unit 20.

Figure 9:
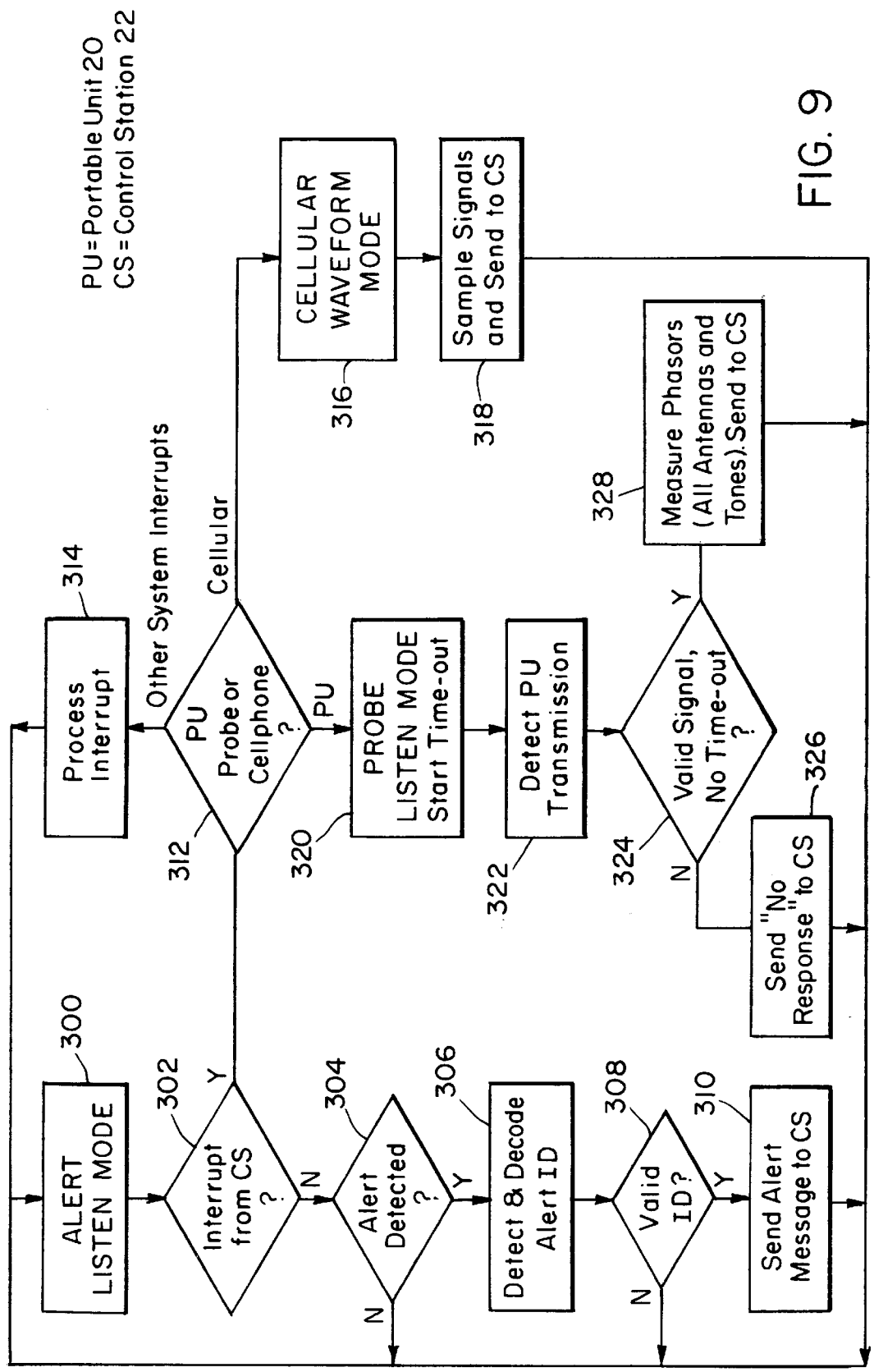
FIG. 9 is a schematic flow diagram illustrating the operational flow of a base station in accordance with the present invention.

FIG. 9 is a schematic flow diagram illustrating the operational flow of a base station in accordance with the present invention. As shown in step 300, the base station normally operates in an alert listen mode in which it waits for an interrupt from the control station 22. As shown in the "N" (no) branch of decision step 302, the flow waits for the interrupt from the control station 22. At the same time, the base station is also waiting for a user-implemented alert in which the user presses a button on a portable unit 20 to implement the position location process. If neither an interrupt from the control station nor an alert from the user is received, then the base station waits in the alert listen mode.

If an alert is detected, the flow proceeds to step 306 in which the alert signal transmitted by the portable unit 20 is detected and decoded to determine the ID of the portable unit 20. In decision step 308, the ID is examined to determine if it is valid. If it is not, flow returns to the alert listen mode at step 300. If the ID is valid, an alert message is sent to the control station 22 in step 310 and flow then returns to the alert listen mode to wait for the control station 22 to initiate the position location process.

When an interrupt is received from the control station 22, flow continues to decision step 312 where it is determined what type of interrupt was issued. If a system interrupt such as a maintenance/calibration request was issued, the request is processed in step 314, and flow returns to the alert listen mode at step 300. If a cellular system location request was made, the base station enters cellular waveform mode at step 316. In step 318, the base station samples signals from the cellular device that is to be located and sends sampled data to the control station 22. Flow then returns to the alert listen mode at step 300 while the control station performs the position location process.

If the determination made in step 312 is that a portable unit is to be located, the base station enters a probe listen mode in step 320. Upon entering the probe listen mode, the base station starts a specified prescribed time-out period. If a portable unit transmission is detected in step 322, it is examined in decision step 324 to determine if it is a valid signal before the time-out period has expired. If not, a "no response" signal is transferred to the control station at step 326, and flow returns to the alert listen mode at step 300. If a valid signal is received from a portable unit within the time-out period, the phasor data at all antennas is measured, and the signal data is sent to the control station 22 at step 328. Flow then returns once again to the alert listen mode in step 300.

Figure 10:
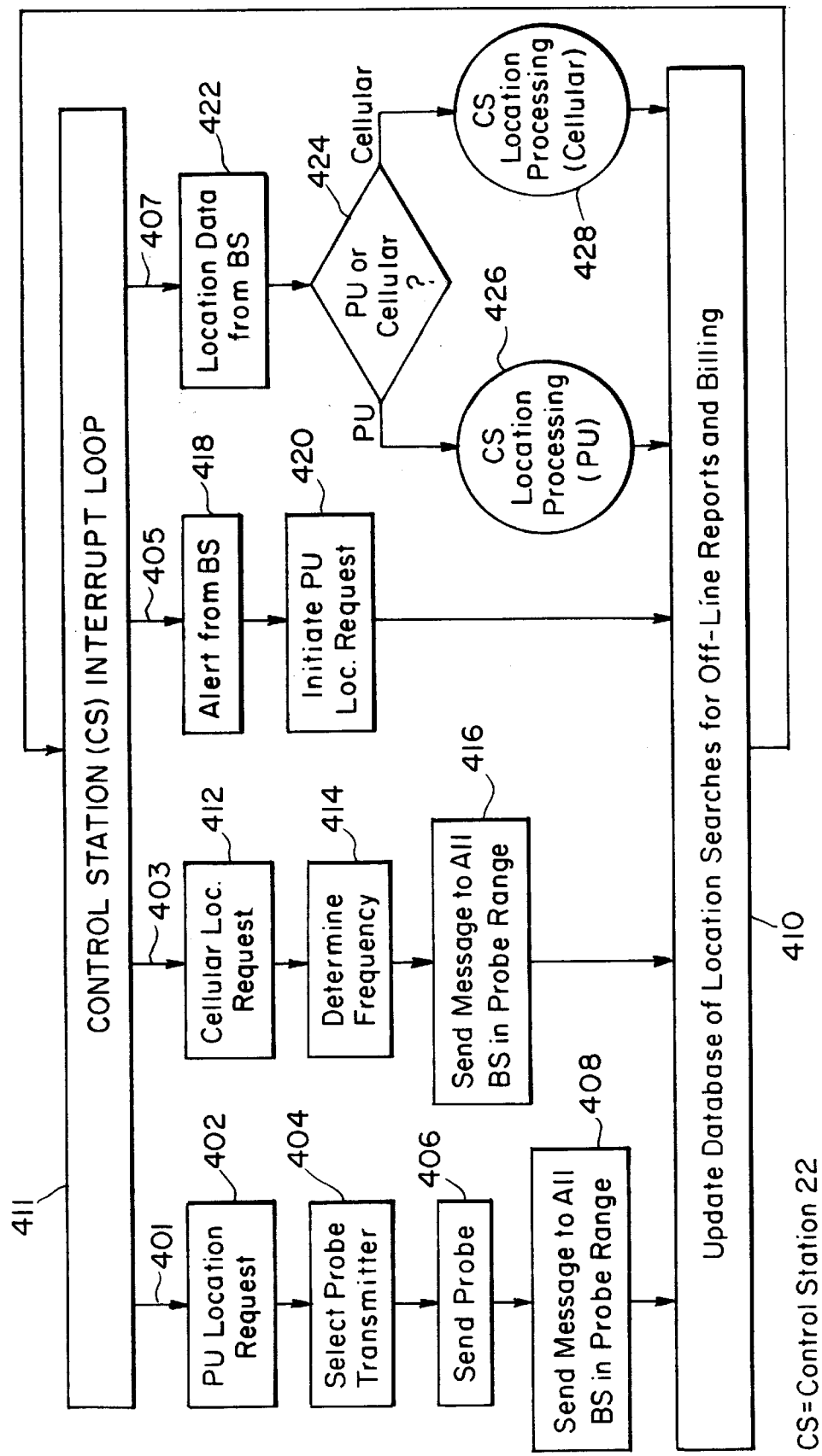
FIG. 10 is a schematic flow diagram illustrating the operational flow of a control station in accordance with the present invention.

FIG. 10 is a schematic flow diagram of the operational flow of the control station 22 in accordance with the present invention. The control station 22 is capable of receiving the outputs of the base station correlation and message receivers via each base station's controller and modem through its connection to an appropriate local network or through an RF link. The outputs of the base station are used at the control station 22 to compute the estimated location of the portable unit 20. The control station 22 also initiates requests for a particular portable unit 20 to transmit its locating tones. The control station 22 also accepts requests from users carrying specific portable units 20 to locate themselves or such requests from groups of portable units 20. The control station 22 can also tell the appropriate base station when, and on what channel, to look for a cellular transmission. The control station 22 can also initiate search procedures to locate objects in the field, as appropriate for the application. The control station 22 in one grid block or geographic area can also be capable of communicating with other control stations serving other grid locks or geographic areas and in other networks of base stations, thus being capable of coordinating wide area searches.

FIG. 10 is a top-level flow diagram illustrating the flow of the control station interrupt loop in accordance with one embodiment of the invention. The loop is entered through one of four branches 401, 403, 405, 407, depending upon how the interrupt was initiated. If a portable unit location request was received as indicated at step 402, branch 401 is entered. A control station transmitter is selected to transmit the probe command in step 404, and the probe is transmitted in step 406. Finally, in step 408, a message is transmitted to all base stations within the probe range informing them that a probe has been transmitted. In one preferred embodiment, the control station 22 generates and maintains a database of location searches in order to provide data for off-line reports and billing. In step 410, the database is updated to include the current search, and flow returns to the top of the interrupt loop at box 411.

If a cellular location request is implemented as shown in box 412, the flow enters through branch 403. The cellular frequency is determined at step 414 and in step 416, a message is sent to all base stations in the probe range.

If an alert is relayed by a base station from a portable unit as shown in step 418, flow enters the interrupt on branch 405. A portable unit location request is initiated at step 420. The database of location searches is updated in step 410, and the flow then continues to step 402 where a normal portable unit location request is implemented.

Branch 407 of the interrupt loop is entered when the control station 22 receives location data from the base stations as indicated in step 422. As shown in decision step 424, if portable unit data is received, then the control station performs portable unit location processing as indicated at step 426. If cellular data is received from the base stations, then cellular processing is performed as indicated at step 428. Once again, after the processing is complete, at step 410, the location search database is updated, and flow returns to the top of the interrupt loop at step 411.

Figure 11:
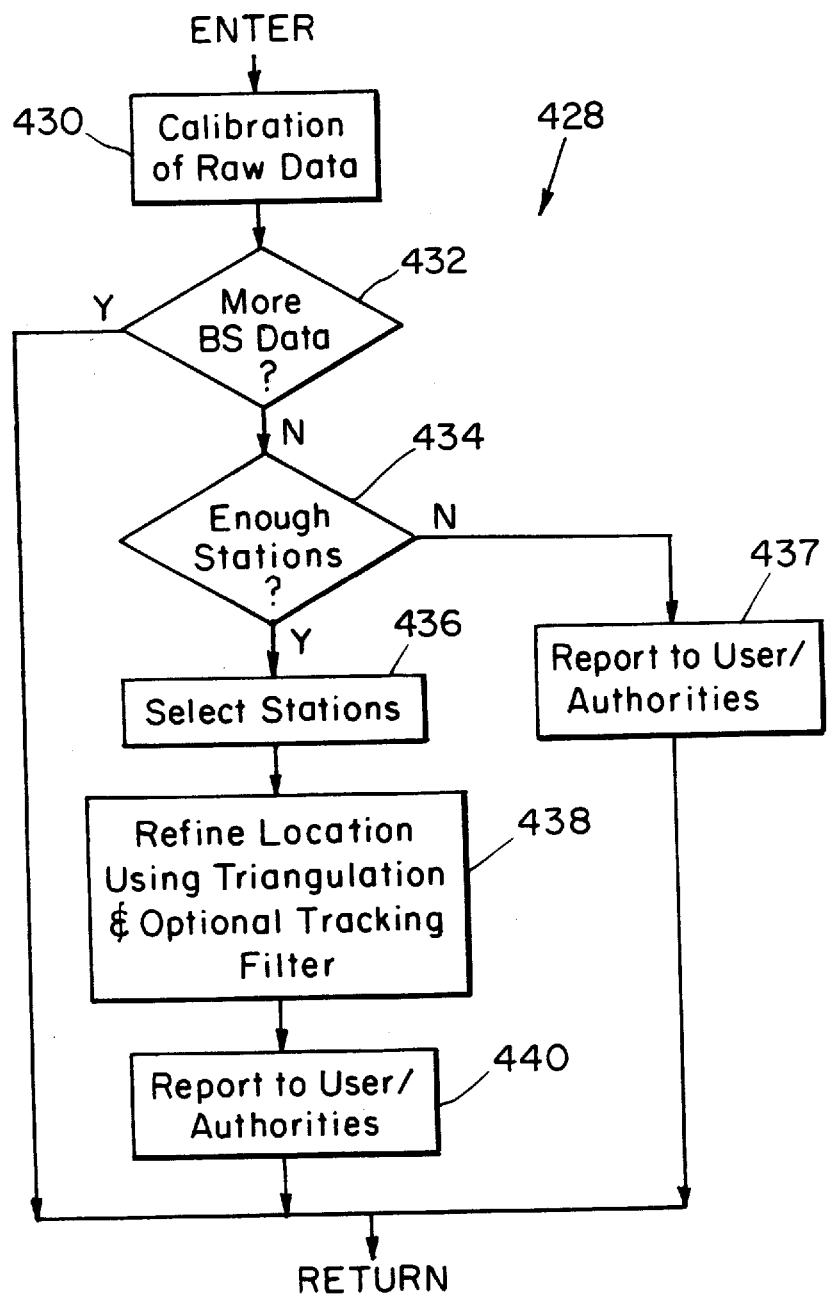
FIG. 11 is a schematic flow diagram illustrating the operational flow of the control station location processing for cellular applications.

FIG. 11 is a flow diagram showing the steps of cellular unit processing indicated in step 428 of FIG. 10. Upon entering the processing procedure 428, raw data is calibrated at step 430. At decision step 432, the process determines whether more base station data is to be received. If so, the flow returns to the main control station interrupt loop shown in FIG. 10 to await more base station data. If all of the data has been received, then flow passes to decision step 434 in which it is determined whether enough base stations have reported data to permit a position location determination. If not, a report is made to the user or authorities in step 437, and flow returns to the main interrupt loop. If enough stations have reported, then the stations whose data is to be used in the position location determination are selected in step 436. The location is computed in step 438 using triangulation. An optional tracking filter to refine the location computation can also be used. In step 440, the location is reported to the user and/or authorities, and flow then returns to the main interrupt loop depicted in FIG. 10.

Figure 12:
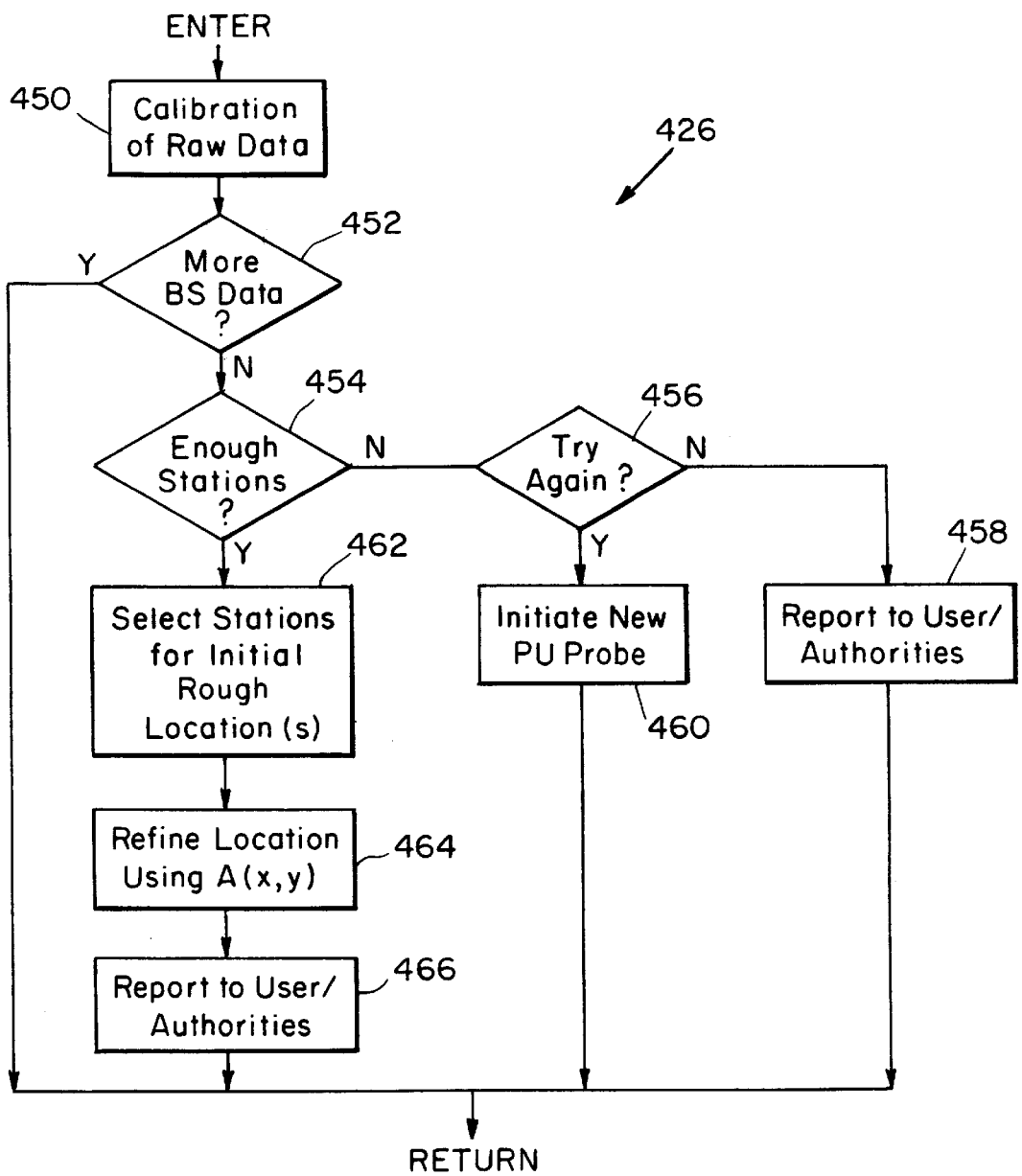
FIG. 12 is a schematic flow diagram illustrating the operational flow of the control station location processing for locating a portable unit in accordance with the present invention.

FIG. 12 is a flow diagram showing the details of portable unit processing indicated in step 426 of FIG. 10. At the beginning of portable unit processing, raw data from the base stations is calibrated in step 450. Next, in decision step 452, the process determines whether more base station data is to be received. If so, flow returns to the main interrupt loop to await the additional base station data. If no more base station data is expected, then flow proceeds to decision step 454 where a determination is made as to whether enough base stations have reported data to permit a position location determination to be made. If not, flow proceeds to decision step 456 where it is decided whether to initiate another attempt at position location. If not, a report is made to the user and/or authorities at step 458, and flow then returns to the main interrupt loop. If it is decided to try again, then a new portable unit probe signal is issued in step 460, and flow once again returns to the main interrupt loop to wait for base station data.

If the decision in step 454 is that enough base stations have reported data, then the stations used for the position location determination are selected in step 462. The initial rough location estimate has been determined in step 462. Next, in step 464, the location of the portable unit is computed directly using the ambiguity function A(x,y) (in the case of two-dimensional position location) as described below in detail. In step 466, the location is reported to the user and/or authorities, and flow then returns to the main interrupt loop.

As described above, in step 464 of the portable unit processing flow shown in FIG. 12, the location of the object 18 and portable unit 20 is computed directly from base station data using a two-dimensional ambiguity function A(x,y). That computation will now be described in detail.

When the control station 22 receives the complex phasors indicative of the locating tone antenna signals from the base stations, it computes the position of the portable unit 20. The following description assumes two antennas at each base station 12 and two received locating tones at each antenna at the radial frequencies $\omega_1$ and $\omega_2$. Let there be K base stations 12 with usable signals. Each base station 12 has two antennas 208, 210, referred to herein as antenna 1 and antenna 2, respectively, and measures four complex phasors, one for each of the two tones and the two antennas. We introduce the notation $r_{kmn}(t)$ to denote the received signal at base station #k, antenna #m, and tone #n and define $$r_{kmn}(t) = a_{kmn} \sin(\omega_n(t - \tau_{km} - t_0)) + n_{kmn}(t), \quad (1)$$

where $a_{kmn}$ is signal amplitude, $n_{kmn}(t)$ the additive noise, $t_0$ the unknown time of transmission, and $\tau_{km}$ the delay. The delay does not depend on the frequency, only on the distance from the object 18 and portable unit 20 to the particular station k and its antenna m.

We introduce the complex phasor $r_{kmn}$ corresponding to $r_{kmn}(t)$:

$$r_{kmn} = \frac{2}{jT} \int_{t_1}^{t_1 + T} a_{kmn} e^{j\omega_n t} r_{kmn}(t) dt. \quad (2)$$

where the known period of integration T includes a section of the received signal, and begins at time $t_1$, and j is the imaginary unit. Carrying out the integration, this is equal to $$r_{kmn} = a_{kmn} e^{j\omega_n(\tau_{km} + t_0)} + \eta_{kmn} \quad (3)$$

in which $\eta_{kmn}$ is the Gaussian noise component of the phasor $r_{kmn}$. Thus, each base station k, with two antennas and using two frequencies, typically provides four complex phasors. For example, for frequencies $\omega_1$ and $\omega_2$ and antennas 1 and 2, we have the following four phasor measurements:

measurement $r_{k11}$ at site k, at its antenna 1 and at radial frequency $\omega_1$,
measurement $r_{k12}$ at site k, at its antenna 1 and at radial frequency $\omega_2$,
measurement $r_{k21}$ at site k, at its antenna 2 and at radial frequency $\omega_1$,
measurement $r_{k22}$ at site k, at its antenna 2 and at radial frequency $\omega_2$.

The complex phasors are next corrected for frequency offsets in the transmission and for timing offsets between the base stations.

Before describing the computation of the invention, it is instructive to consider some simplified cases which can be likened to direction finding (DF) and pseudo-ranging (PR) or time difference of arrival (TDOA) techniques. Using the notation adopted above, the direction of arrival of the signal can be derived. At one frequency $\omega_1$ only, at a particular base station k, there is essentially no time offset between its two antennas located in close proximity to each other; there is only a phase difference due to the receiver antenna spacing, i.e., the distance separating antenna #1 from antenna #2, which we shall denote by d. Thus, $$r_{k11} = a_{k11} e^{j\omega_1(\tau_{k1} + t_0)} + \eta_{k11}, \quad (4)$$

$$r_{k21} = a_{k21} e^{j\omega_1(\tau_{k2} + t_0)} + \eta_{k21}; \quad (5)$$

and since the phase difference for a signal arriving at an angle θ from boresight due to that distance is equal to the phase difference of the phasors, we have $$2\pi(d_{12}/\lambda_1) \sin \theta = \omega_1(\tau_{k2} - \tau_{k1}), \quad (6)$$

where $d_{12}$ is the distance between antenna #1 and antenna #2, and $\lambda_1 = 2\pi c/\omega_1$ is the wavelength at the frequency $\omega_1$. From this relationship, it follows that an estimate of the phase difference between the signals at a pair of antennas at any base station 12 can lead to the determination of the angle θ at that base station to the object, and hence the determination of direction.

Given the knowledge of base station locations and the direction from any two base stations 12 to the object 18, the object's location can be determined by triangulation. Given the direction from several pairs of base stations, the location can be further refined. Such an approach relies on directional estimates, and this method of obtaining direction described thus far is similar to conventional direction finding.

The other approach whose description will help clarify the description of the present invention is the PR pseudo-ranging (or Time-Difference-of-Arrival) method. This method involves estimation of phase differences of the phasors to establish the time-differences-of arrival at any pair of base stations. We begin with the simplest example of our transmitted signal structure, whereby the portable unit 20 transmits tones at two different radial frequencies $\omega_1$ and $\omega_2$, so that there is a known frequency offset $$\Omega = \omega_2 - \omega_1. \quad (7)$$

Thus, the phasors at, for example, the antenna #1, at the base station #k, at the two different frequencies, are:

$$r_{k11} = a_{k11} e^{j\omega_1(\tau_{k1} + t_0)} + \eta_{k11}, \quad (8)$$

$$r_{k12} = a_{k12} e^{j\omega_2(\tau_{k1} + t_0)} + \eta_{k12} = a_{k12} e^{j(\omega_1 + \Omega)(\tau_{k1} + t_0)} + \eta_{k12}. \quad (9)$$

We assume that signal strength at the two frequencies is approximately the same, $a_{k11} = a_{k12}$, because of the small frequency offset $\Omega$. Hence the phase difference at antenna #1 at station k between signals at the two frequencies is $$\omega_2(\tau_{k1} + t_0) - \omega_1(\tau_{k1} + t_0) = \Omega(\tau_{k1} + t_0). \quad (10)$$

Similarly, for a specific base station #l, the same phase difference at its antenna #1 becomes $$\omega_2(\tau_{l1} + t_0) - \omega_1(\tau_{l1} + t_0) = \Omega(\tau_{l1} + t_0) \quad (11)$$

Therefore, the phase differences at the two transmitted frequencies at this pair of base stations becomes $$\Omega(\tau_{k1} + t_0) - \Omega(\tau_{l1} + t_0) = \Omega(\tau_{k1} - \tau_{l1}). \quad (12)$$

Since the locus of all the points with the same time difference from #k and #l is a hyperbola, once the time difference $\tau_{k1} - \tau_{l1}$ is estimated, the hyperbola on which the signal emitting object 18 must be located becomes known. Different pairs of base stations generate a multiplicity of such hyperbolae; the area where they intersect defines the estimated region of location of the object. This method of measuring time differences of arrival outlined above is, in effect, the standard TDOA method for a two tone signal structure.

With this background, we next describe the approach used to identify the most probable location of the object 18 in the preferred version of the present invention. While our approach is different than either DF and TDOA, the prior discussion of these other methods in our notation can be helpful in evidencing that our approach combines angle of arrival and TDOA data onto an optimized estimate of object position. The estimated position of the object is derived by selecting as the function to maximize that function which will minimize the joint probability of error with respect to all the measurements. In one preferred embodiment, we assume that errors are induced by Gaussian noise at each receiver.

In the example of two antennas 1 and 2 and two frequencies 1 and 2, and given the coordinates of the true position $(x,y)$, we denote the joint probability of error, conditional on x,y as:

$$P[r_{k11}, r_{k12}, r_{k21}, r_{k22}; k=1,2,3,4 | x,y]. \qquad (13)$$

The four complex phasors received at the base station k (at antennas 1 and 2, and at frequencies 1 and 2) can be represented by phasors:

$$r_{k11} = [a_k \cdot exp(j\phi_k) \cdot exp(j\Omega_1(\tau_{k1}+t_0))] + \eta_{k11} \qquad (14)$$

$$r_{k12} = [a_k \cdot exp(j\phi_k) \cdot exp(j\Omega_2(\tau_{k1}+t_0))] + \eta_{k12} \qquad (15)$$

$$r_{k21} = [a_k \cdot exp(j\phi_k) \cdot exp(j\Omega_1(\tau_{k2}+t_0))] + \eta_{k21} \qquad (16)$$

$$r_{k22} = [a_k \cdot exp(j\phi_k) \cdot exp(j\Omega_2(\tau_{k2}+t_0))] + \eta_{k22} \qquad (17)$$

where $\eta_{kmn}$ represents noise at the base station k, at antenna m, and at frequency n, and where $\phi_k$ is an unknown phase depending only on the base station k.

To maximize the joint conditional Gaussian probability, specified above, we minimize the mean square error. The location $(x,y)$ at which this minimum occurs is taken as the estimate of the object position.

Defining $$\alpha_k = a_k exp\, j\phi_k, \qquad (18)$$

we form the log-likelihood function. Ignoring proportionality constants, it can be seen that the function in question is given by $$\min_{t_0} \sum_{k=1}^{K} \min_{\alpha_k} \left( \begin{array}{c} |r_{k11} - \alpha_k exp\{j\omega_1(\tau_{k1}+t_0)\}|^2 + |r_{k12} - \alpha_k exp\{j\omega_2(\tau_{k1}+t_0)\}|^2 + \\ |r_{k21} - \alpha_k exp\{j\omega_1(\tau_{k2}+t_0)\}|^2 + |r_{k22} - \alpha_k exp\{j\omega_2(\tau_{k2}+t_0)\}|^2 \end{array} \right). \qquad (19)$$

When we carry out the minimization of the mean square error and ignoring the terms independent of location $(x,y)$, we find that for K antenna sites, each with two antennas, and each receiving at two frequencies, we need to determine those location coordinates $(x,y)$ that maximize the ambiguity function:

$$A(x,y) \cong R(Z_1) + |Z_2|, \qquad (20)$$

where $R(.)$ denotes the real value, and $|.|$ the absolute value of the function in the argument, and where $$Z_1 = \sum_{k=1}^{K} (r_{k11} r'_{k21} exp[j\omega_1(\tau_{k2} - \tau_{k1})] + r_{12} r'_{22} exp[j\omega_2(\tau_{k2} - \tau_{k1})]) \qquad (21)$$

and $$Z_2 = \qquad (22)$$

$$\sum_{k=1}^{K} \left( \begin{array}{c} r_{k11} r'_{k12} exp(j\Omega\tau_{k1}) + r_{k21} r'_{k22} exp(j\Omega\tau_{k2}) + \\ r_{k11} r'_{k22} exp[j(\omega_2\tau_{k2} - \omega_1\tau_{k1})] + r_{k11} r'_{k22} exp[j(\omega_2\tau_{k1} - \omega_1\tau_{k2})] \end{array} \right)$$

in which $r'_{kmn}$ is the complex conjugate of $r_{kmn}$ for (m,n=1, 2), and $\Omega = \omega_2 - \omega_1$.

If the function $A(x,y)$ defined above in equation (19) is called the ambiguity function, and if it were plotted in three dimensions against x and y, the optimum estimate of the true location $(x,y)$ in our process is the point $(x,y)$ at which this decision function $A(x,y)$ reaches its maximum value. In the position location process of the invention, the coordinates $(x,y)$ that maximize $A(x,y)$ are taken as the most likely object location. The function $A(x,y)$ may be maximized by standard techniques such as an iterative search to converge to the maximum through trial-and-error and gradient search.

In one specific embodiment of the invention, we find the maximum of the ambiguity function $A(x,y)$ by converging iteratively to the location $(x,y)$ being sought. In this embodiment, an initial estimate of $(x,y)$ can be obtained by triangulation.

In the preferred embodiment of the invention, such a preliminary estimate of the average location is only used as the initial value in the process for the accurate determination of object location. The process then proceeds to improve on the initial estimate by performing a further iterative search for the best estimate of the desired location of the maximum of $A(x,y)$. It is one of the important features of the invention that such a preliminary estimate, located somewhere in the space surrounded by all the likely intersections, can be defined more precisely, and its accuracy can be greatly improved by defining a composite function of the difference individual measurements.

A further refinement of the process of the invention described herein consists of also taking into account other information of the location signal returned from the object and received at the several base stations and at the several frequencies. This is accomplished by applying weights to the phasors, such as $r_{k11}$, $r_{k12}$, $r_{k21}$, and $r_{k22}$ (and their conjugates), and allocating a higher weight to those phasors which display a stronger signal (or less noise), and/or indicate less multipath perturbation (i.e., less amplitude modulation). In this manner the potential location error is further minimized. One optimization approach used to maximize the ambiguity function $A(x,y)$ is described as follows:

1. Set $(x_0, y_0)$ to the initial estimate and the search grid size h to 100 ft (for example).

2. Calculate $A(x,y)$ values at the five points:
   $A(x_0, y_0)$,
   $A(x_0+h, y_0)$,
   $A(x_0-h, y_0)$,
   $A(x_0, y_0+h)$ and
   $A(x_0, y_0-h)$.

3. Assuming $A(x_0+h,y_0)$, and $A(x_0,y_0+h)$ are the two largest corner point values, also calculate $A(x_0+h,y_0+h)$.
4. Find the maximum, $(\hat{x},\hat{y})$, of a parabolic surface through these six points.
5. If $(\hat{x},\hat{y})$ is further than h from $(x_0,y_0)$ repeat the process for $(x_0,y_0)=(x_0+h,y_0+h)$, adding three new points in that direction.
6. If $(\hat{x},\hat{y})$ is less than h from $(x_0,y_0)$ use $(\hat{x},\hat{y})$ as the final estimate.

In general, it is noted from the equations (21) and (22) defining $Z_1$ and $Z_2$, that the search for the maximum of $A(x,y)$ reduces to a generalized DF method when only one tone is used and we ignore $Z_2$. If the process of the invention is followed, such a generalized DF method can use the same measurements as the conventional DF method, but combines said measurements in a different way that includes amplitude information which results in a better location estimate. Similarly, the process of the invention can reduce to an optimum generalized PR method when only one antenna is used at each base station and $Z_1$ is ignored.

Thus, from the foregoing description it will be seen that one advantage of the position location approach of the invention is that its use permits the combining of DF and TDOA methods in a predetermined numerical fashion based on sound analytical foundations and the reliance on the common assumption about Gaussian characteristics of additive noise. Another advantage of the invention is that weak signals, which are less reliable, receive less weighting. Yet another advantage is that the effect of signals interfered with by multipath (which can be detected from envelope modulation) can be de-emphasized by having them given less weight, or even eliminated from the computation.

In addition, the invention can be readily generalized further to the combining of measurements at more than two antennas at a particular base station. Likewise, when there are more than two transmitted tones from the object (that are then received at a particular antenna), we can consider the different pairs of frequencies and the multiple phasor terms that arise. Such generalizations are a direct extension of the process described above using two antennas and two received tones at each site.

As mentioned above, the system and method of the invention can also be used to locate position of the portable unit in three dimensions. This allows the system to also determine elevation of the portable unit. The three-dimensional approach can be implemented in at least two ways. First, the process described above can first be used to estimate the two-dimensional (x,y) location. Then, one or more vertical antennas can be used to estimate the elevation z, again using the two-dimensional approach. Another preferred method is to extend the above analysis to three-dimensional estimation of (x,y,z). In this approach, a three-dimensional ambiguity function $A(x,y,z)$ is computed from the complex phasors generated for the received locating signal at each antenna of the appropriate base stations. The ambiguity function $A(x,y,z)$ is optimized to generate an estimate of the position of the portable unit transmitting the locating signal.

The more general three-dimensional case will now be described in detail. Assume N tones of the locating signal and M element receivers at each of the K base stations. As will be described, the process is simpler if pairs of tones are used at a time.

The signals at the k'th base station are:

At element #1:

$$r_{k11} = a_k \cdot e^{j\phi_k} \cdot e^{j\omega_1(\tau_{k1s}+t_{0s})} + \eta_{k11}, \quad (23)$$

.
.
.

$$r_{k1n} = a_k \cdot e^{j\phi_k} \cdot e^{j\omega_n(\tau_{k1s}+t_{0s})} + \eta_{k1n},$$

.
.
.

$$r_{k1N} = a_k \cdot e^{j\phi_k} \cdot e^{j\omega_N(\tau_{k1s}+t_{0s})} + \eta_{k1N}, \overline{|\eta_{k11}|^2} = \overline{|\eta_{k1n}|^2} = \sigma^2 = 2N_0/T_1.$$

At element #m:

$$r_{km1} = a_k \cdot e^{j\phi_k} \cdot e^{j\omega_1(\tau_{kms}+t_{0s})} + \eta_{km1}, \quad (24)$$

.
.
.

$$r_{kmn} = a_k \cdot e^{j\phi_k} \cdot e^{j\omega_n(\tau_{kms}+t_{0s})} + \eta_{kmn}, \overline{|\eta_{kmn}|^2} = \sigma^2 = 2N_0/T_1.$$

The log-likelihood function is, maximizing over the unknown amplitudes and phases and ignoring proportionality constants, $$\Lambda(x,y,z) = \quad (25)$$

$$\log P[r_{kmn}, k=1\ldots K, m=1,\ldots M, n=1\ldots N | x,y,2z] \cong$$

$$-\min_{\alpha_k, t_0} \sum_{k=1}^{K} \sum_{m=1}^{M} \sum_{n=1}^{N} |r_{kmn} - \alpha_k e^{j\omega_n(\tau_{km}+t_0)}|^2.$$

This can be rewritten as $$\Lambda(x,y,z) \cong -\min_{\alpha_k, t_0} \sum_{k=1}^{K} \left( \sum_{m=1}^{M} \sum_{n=1}^{N} |r_{kmn}|^2 + MN|\alpha_k|^2 - 2\Re[Y_k \alpha'_k] \right); \quad (26)$$

where $$Y_k = \sum_{n=1}^{N} \sum_{m=1}^{M} r_{kmn} e^{-j\omega_n(\tau_{km}+t_0)}.$$

Minimizing over $\alpha_k$ we get $$\Lambda(x,y,z) \cong -\min_{t_0} \sum_{k=1}^{K} \left( \sum_{m=1}^{M} \sum_{n=1}^{N} |r_{kmn}|^2 - \frac{1}{MN} |Y_k|^2 \right). \quad (27)$$

Ignoring the terms independent of location (x,y,z) we want to find the location (x,y,z) which maximizes the function $$A_0(x,y,z) \cong \max_{t_0} \sum_{k=1}^{K} |Y_k|^2 = \max_{t_0} \sum_{k=1}^{K} |\sum_{n=1}^{N} \sum_{m=1}^{M} r_{kmn} e^{-j\omega_n(\tau_{km}+t_0)}|^2. \quad (28)$$

In general when N>2 the maximum over $t_0$ depends on the assumed location. Thus, for more than two tones we would need to maximize the four-dimensional function $$\overline{A}(x,y,z,t_0) \cong \sum_{k=1}^{K} |\sum_{n=1}^{N} \sum_{m=1}^{M} r_{kmn} e^{-j\omega_n(\tau_{km}+t_0)}|^2, \quad (29)$$

which could be done with conventional maximization techniques. However, the solution is simplified if only two tones are considered at a time, since the maximization over $t_0$ can be found analytically:

$$A_0(x, y, z) \triangleq \qquad (30)$$

$$\max_{t_0} \sum_k \sum_{n_1} \sum_{n_2} \sum_{m_1} \sum_{m_2} r_{km_1n_1} r'_{km_2n_2} e^{-j\omega_1 \tau_{km_1} + j\omega_2 \tau_{km_2} - jt_0(\omega_1 - \omega_2)} =$$

$$\max_{t_0} \left\{ \begin{array}{l} \sum_k \sum_{m_1} \sum_{m_2} r_{km_1} 1 r'_{km_2} 1 e^{-j\omega_1(\tau_{km_1} - \tau_{km_2})} + \\ \sum_k \sum_{m_1} \sum_{m_2} r_{km_1} 2 r'_{km_2} 2 e^{-j\omega_2(\tau_{km_1} - \tau_{km_2})} + \\ 2 \Re e^{-jt_0(\omega_1 - \omega_2)} \sum_k \sum_{m_1} \sum_{m_2} r_{km_1} 1 r'_{km_2} 2 e^{-j\omega_1 \tau_{km_1} + j\omega_2 \tau_{km_2}} \end{array} \right\} =$$

$$\left\{ \begin{array}{l} \sum_k \sum_{m_1} \sum_{m_2} r_{km_1} 1 r'_{km_2} 1 e^{-j\omega_1(\tau_{km_1} - \tau_{km_2})} + \\ \sum_k \sum_{m_1} \sum_{m_2} r_{km_1} 2 r'_{km_2} 2 e^{-j\omega_2(\tau_{km_1} - \tau_{km_2})} + \\ 2 \left| \sum_k \sum_{m_1} \sum_{m_2} r_{km_1} 1 r'_{km_2} 2 e^{-j\omega_1 \tau_{km_1} + j\omega_2 \tau_{km_2}} \right| \end{array} \right\}$$

In the first two lines the terms correlating the same antenna elements do not depend on (x,y,z) so we can maximize $$A(x, y, z) = \Re Z_1 + |Z_2|,$$

$$Z_1 = \sum_k \sum_{m_1} \sum_{m_2 > m_1} \left( \begin{array}{l} r_{km_1} 1 r'_{km_2} 1 e^{-j\omega_1(\tau_{km_1} - \tau_{km_2})} + \\ r_{km_1} 2 r'_{km_2} 2 e^{-j\omega_2(\tau_{km_1} - \tau_{km_2})} \end{array} \right) \qquad (31)$$

$$Z_2 = \sum_k \sum_{m_1} \sum_{m_2} r_{km_1} 1 r'_{km_2} 2 e^{-j\omega_1 \tau_{km_1} + j\omega_2 - \tau_{km_2}}.$$

This generalizes the algorithm to two tones, multiple antennas, and three dimensions. For more than two tones we add A( ) as calculated for pairs of tones.

While this invention has been particularly shown and described with references to preferred embodiments thereof, it will be understood by those skilled in the art that various changes in form and details may be made therein without departing from the spirit and scope of the invention as defined by the appended claims.

We claim:

1. A position location system comprising:
   a portable unit comprising a transmitter that transmits a locating signal which is composed of at least two tone components;
   a plurality of base stations that receive the locating signal, each base station comprising:
      one or more antennas that receive the locating signal, with at least one base station having at least two antennas;
      at least one receiver coupled to each of the antennas, the receiver generating values indicative of amplitude and phase of at least two tone components of the locating signal, as received at the corresponding antenna and measured at a defined time; and
   a processor that receives the values indicative of amplitude and phase from the plurality of receivers at the base stations, and combines the values indicative of amplitude and phase to determine the position of the portable unit.

2. The position location system of claim 1 wherein the locating signal comprises a plurality of single-frequency sinusoidal tones transmitted at the same time, the amplitude and phase values being uniquely identified over a period of observation by the multiple finite duration tone components.

3. The position location system of claim 1 wherein the locating signal comprises a plurality of single-frequency sinusoidal tones transmitted in succession, the amplitude and phase values being uniquely identified over a period of observation by the multiple finite duration tone components.

4. The position location system of claim 1 wherein:
   at least four of the base stations are arranged in a rectangular pattern such that one of the base stations is located at each corner of a rectangle;
   each base station comprises two antennas that are positioned on the base station to define an antenna axis which passes through the positions of the two antennas; and
   the antenna axes of base stations located at adjacent corners of the rectangle are orthogonal to one another.

5. The position location system of claim 1 further comprising a time reference that provides timing information synchronizing the base stations, said timing information being used by the processor to select the defined times of measurement of the values indicative of amplitude and phase, the timing information being further used by the processor to compensate for differences in the time of measurement among different receivers to determine the position of the portable unit.

6. The position location system of claim 1 wherein the processor determines the position of the portable unit in two dimensions.

7. The position location system of claim 1 wherein the processor determines the position of the portable unit in three dimensions.

8. The position location system of claim 1 wherein the processor determines elevation of the portable unit.

9. The position location system of claim 1 wherein position of the portable unit is determined in response to a standard commercial paging signal transmitted to the portable unit.

10. The position location system of claim 1 wherein position of the portable unit is determined in response to a command issued by the portable unit.

11. The position location system of claim 1 wherein position of the portable unit is determined in response to a command issued by the processor.

12. The position location system of claim 1 wherein the portable unit is a two-way commercial pager.

13. A position location system comprising:
   a portable unit comprising a transmitter for transmitting a pair of tones in succession;
   a plurality of base stations for receiving the tones, each base station comprising:
      a pair of antennas, each of which receives the pair of tones, and
      a receiver coupled to each antenna that generates a complex-valued representative signal indicative of amplitude and phase of each of the tones as received at the antennas, the receivers being synchronized with one another; and
   a processor that receives the complex-valued representative signals from the base stations and combines amplitude and phase information for each of the tones to determine the position of the portable unit.

14. The position location system of claim 13 further comprising a time reference that provides timing information synchronizing the base stations, said timing information being used by the processor to synchronize the time of measurement of the values indicative of amplitude and phase among the receivers, and the timing information being further used by the processor to compensate for differences in the time of measurement among different receivers to determine the position of the portable unit.

15. A method of determining position of a portable unit comprising the steps of:
   within the portable unit, transmitting a locating signal composed of at least two tone components;
   within each of a plurality of base stations, receiving the locating signal at one or more antennas, and within at least one base station, receiving the locating signal with at least two antennas;
   coupling each antenna to a receiver;
   within each receiver, generating amplitude and phase values from the locating signal as received by the antenna, the values indicative of amplitude and phase of at least two tone components of the locating signal, as received at the corresponding antenna and measured at defined times; and
   within a processor, combining the values indicative of amplitude and phase for the tone components from a plurality of the receivers to determine the position of the portable unit.

16. The method of claim 15 wherein the locating signal comprises a plurality of single-frequency sinusoidal tones transmitted at the same time, the amplitude and phase values being uniquely identified over a period of observation by the multiple finite duration tone components.

17. The method of claim 15 wherein the locating signal comprises a plurality of single-frequency sinusoidal tones transmitted in succession, the amplitude and phase values being uniquely identified over a period of observation by the multiple finite duration tone components.

18. The method of claim 15 further comprising:
   arranging at least four of the base stations in a rectangular pattern such that one of the base stations is located at each corner of the rectangle;
   providing each base station with two antennas positioned on the base station to define an antenna axis that passes through the positions of the two antennas; and
   orienting the antenna axes of base stations located at adjacent corners of the rectangle orthogonal to one another.

19. The method of claim 15 further comprising combining locating signal timing information with the locating signal amplitude and phase information to determine the position of the portable unit.

20. The method of claim 15 wherein position of the portable unit is determined in two dimensions.

21. The method of claim 15 wherein position of the portable unit is determined in three dimensions.

22. The method of claim 15 wherein elevation of the portable unit is determined.

23. The method of claim 15 wherein position of the portable unit is determined in response to a standard commercial paging signal transmitted to the portable unit.

24. The method of claim 15 wherein position of the portable unit is determined in response to a command issued by the portable unit.

25. The method of claim 15 wherein position of the portable unit is determined in response to a command issued by the processor.

26. The method of claim 15 wherein the step of transmitting a locating signal with the portable unit comprises the step of transmitting a locating signal from a standard commercial two-way pager.

27. The system of claim 1 wherein the portable unit comprises a cellular phone.

28. The system of claim 13 wherein the portable unit comprises a cellular phone.

29. The method of claim 15 wherein the portable unit comprises a cellular phone.

30. A system comprising:
   a plurality of base stations that receive a radio signal from a transmitter and generate in-phase and quadrature complex values indicative of the amplitude and phase of at least two tone components of the radio signal as received at at least one antenna, wherein the complex values are measured within each receiver at a defined time, at least one base station having two or more antennas; and
   a processor that receives the in-phase and quadrature complex values from the base stations to determine the position of the transmitter.

31. The system of claim 30 wherein the transmitter comprises a cellular phone.

32. A system as in claim 30 in which the radio signal comprises a plurality of tones.

33. A system as in claim 32 wherein the processor produces a plurality of complex phasor values $r_{kmn}$ from the in-phase and quadrature complex values, where k is an index to the number of base stations in the system, n is an index to the number of tones in the radio signal, and m is an index to the number of antennas at the $k^{th}$ base station, to determine the position of the transmitter.

34. A system as in claim 33 wherein the processor makes a decision as to the position of the transmitter by determining coordinates that maximize a value of a function, A, derived from the complex phasor values $r_{kmn}$.

35. A system as in claim 34 wherein the function, A, with which the processor makes a position decision depends upon a sum, for each base station, of complex phasor values for each tone multiplied by a complex conjugate of a complex phasor value at other tones.

36. A system as in claim 34 wherein the processor determines values for the function, A, at an initial estimated position $(X_o, Y_o)$, as well as a plurality of positions offset from the initial estimated position $(X_o, Y_o)$ by a predetermined grid distance, h, and fits a parabolic surface to the plurality of functions so derived, and selects the position of a maximum height of the parabolic surface as the location of the transmitter.

37. A system as in claim 34 wherein the function is given by:

$$A(x,y) \approx R(Z_1) + |Z_2|,$$

where R(.) denotes real value, |.| denotes absolute value, and where $$Z_1 = \sum_{k=1}^{K} (r_{k11}r'_{k21}\exp[j\omega_1(\tau_{k2} - \tau_{k1})] + r_{k12}r'_{k22}\exp[j\omega_2(\tau_{k2} - \tau_{k1})])$$

and $$Z_2 = \sum_{k=1}^{K} \left( r_{k11}r'_{k12}\exp(j\Omega\tau_{k1}) + r_{k21}r'_{k22}\exp(j\Omega\tau_{k2}) + r_{k11}r'_{k22}\exp[j(\omega_2\tau_{k2} - \omega_1\tau_{k1})] + r_{k11}r'_{k22}\exp[j(\omega_2\tau_{k1} - \omega_1\tau_{k2})] \right)$$

where $r'_{kmn}$ is the complex conjugate of $r_{kmn}$, $\omega_1$ and $\omega_2$ are two tone component frequencies, $\Omega$ is equal to $(\omega_2 - \omega_1)$, and $\sigma_{km}$ is a propagation time delay from the transmitter to a given base station, k, and an associated antenna, m.

38. The position location system of claim 1 wherein the at least one receiver additionally comprises:

a local complex reference signal generator, for generating a local complex reference signal;

at least one correlator, coupled to the local complex reference signal generator and coupled to receive the complex receiver signal, to generate representative complex vector values indicative of the amplitude and phase of the tone component of the complex receiver signal; and wherein the processor uses the complex vector values to determine the position of the portable unit.

* * * * *